(12) United States Patent
Shirakawa

(10) Patent No.: US 7,859,370 B2
(45) Date of Patent: Dec. 28, 2010

(54) ELECTROSTATIC ACTUATOR

(75) Inventor: Kazuhiko Shirakawa, Ikoma-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/095,359

(22) Filed: Mar. 30, 2005

(65) Prior Publication Data

US 2005/0219017 A1 Oct. 6, 2005

(30) Foreign Application Priority Data

Mar. 31, 2004 (JP) ............... 2004-105845
Oct. 29, 2004 (JP) ............... 2004-316721

(51) Int. Cl.
*H01H 51/22* (2006.01)
(52) U.S. Cl. ................. 335/78; 200/181
(58) Field of Classification Search .......... 335/78; 200/181
See application file for complete search history.

(56) References Cited

U.S. PATENT DOCUMENTS

| | | | |
|---|---|---|---|
| 5,357,230 A * | 10/1994 | Mikawa | 335/78 |
| 5,867,302 A * | 2/1999 | Fleming | 359/291 |
| 6,069,540 A * | 5/2000 | Berenz et al. | 333/101 |
| 6,657,525 B1* | 12/2003 | Dickens et al. | 335/78 |
| 6,734,770 B2* | 5/2004 | Aigner et al. | 335/78 |
| 6,787,438 B1* | 9/2004 | Nelson | 438/584 |
| 6,875,936 B1 | 4/2005 | Suzuki et al. | |
| 2002/0006248 A1 | 1/2002 | Makino et al. | |
| 2002/0140533 A1* | 10/2002 | Miyazaki et al. | 335/78 |
| 2003/0076006 A1 | 4/2003 | Suzuki | |
| 2004/0146298 A1 | 7/2004 | Ikegame | |
| 2004/0155736 A1 | 8/2004 | Song et al. | |
| 2005/0001701 A1 | 1/2005 | Shirakawa | |
| 2005/0040486 A1 | 2/2005 | Song et al. | |

FOREIGN PATENT DOCUMENTS

| | | |
|---|---|---|
| EP | 1 093 143 | 4/2001 |
| JP | 2000-188050 | 7/2000 |
| JP | 2000-348595 | 12/2000 |

(Continued)

OTHER PUBLICATIONS

"Current Situation of MEMS Technology and Its Problems," *Technology Evaluation and Resaearch Report* (Technology Trend), No. 3, published on Mar. 28, 2003 by Ministry of Economy, Trade, and Industry, Industrial Science and Technology Policy and Environment Bureau, Technology Evaluation and Research Division, Manufacturing Industries Bureau, Industrial Machinery Division.

*Primary Examiner*—Anh T Mai
*Assistant Examiner*—Bernard Rojas
(74) *Attorney, Agent, or Firm*—David G. Conlin; Steven M. Jensen; Edwards Angell Palmer & Dodge LLP

(57) ABSTRACT

A switch with an actuator has two supporting columns on a substrate, and a rocking plate on the supporting columns. The rocking plate is pivoted by (pivotally mounted on) the two supporting columns. The rocking plate is made of conductive material, so that it can be subjected to electrostatic force of an adsorption electrode. In the switch, it is not necessary to provide a narrow beam to support the rocking plate, because the rocking plate is pivoted by the supporting columns. Therefore, the switch is a long-life microswitch.

18 Claims, 22 Drawing Sheets

FOREIGN PATENT DOCUMENTS

| | | |
|---|---|---|
| JP | 2001-170900 | 6/2001 |
| JP | 2001-198897 | 7/2001 |
| JP | 2001-305441 | 10/2001 |
| JP | 2002-258174 | 9/2002 |
| JP | 2002-287045 | 10/2002 |
| JP | 2003-127100 | 5/2003 |
| JP | 2004-020752 | 1/2004 |
| JP | 2004-053839 | 2/2004 |
| JP | 2004-079534 | 3/2004 |

* cited by examiner

ELECTROSTATIC ACTUATOR

This nonprovisional application claims priority under 35 U.S.C. §119(a) on Patent Application No. 105845/2004 filed in Japan on Mar. 31, 2004, and Patent Application No. 316721/2004 filed in Japan on Oct. 29, 2004. The entire contents of these applications are hereby incorporated by reference.

FIELD OF THE INVENTION

The present invention relates to an electrostatic actuator in which adsorption electrodes provided on a substrate electrostatically attract a rocking plate.

BACKGROUND OF THE INVENTION

As described in publication 1, MEMS (Micro Electro Mechanical Systems) are devices into which a variety of mechanical, electronic, optical, chemical, and other functions are integrated by semiconductor micro fabrication technology (semiconductor processing) or the like.

Currently, the MEMS are used to develop microswitches (switches in micro size) using an electrostatic actuator.

One example of such a microswitch is disclosed in publication 2. FIGS. 31(a) and 31(b) are explanatory diagrams illustrating the switch of publication 2.

As shown in FIGS. 31(a) and 31(b), the microswitch has a seesaw-like structure. In the microswitch, a rocking plate 81 is provided at the center of a beam (supporting leg) 84, which is provided in a column 80. The rocking plate 81 has a narrow-plate shape, and is provided with electrodes respectively at both ends.

On such parts of the substrate as to respectively oppose both ends of the rocking plate 81, adsorption electrodes (electrostatic force applying electrodes) 82 and substrate contact points 83 are provided. When an electric field is applied to one of the adsorption electrodes 82, the rocking plate 81 is attracted to the substrate. In this way, switching operation for connecting one of the electrodes of the rocking plate 81 and one of the substrate contact points 83 is performed.

Thus, the seesaw-like structure of the microswitch allows for driving the rocking plate 81 at a low voltage.

Publication 1: "Current Situation of MEMS Technology and Its Problems", *Technology Evaluation and Research Report* (*Technology Trend*), No. 3 (published on Mar. 28, 2003 by Ministry of Economy, Trade, and Industry, Industrial Science And Technology Policy and Environment Bureau, Technology Evaluation and Research Division, Manufacturing Industries Bureau, Industrial Machinery Division)

Publication 2: Japanese Publication for Unexamined Patent Application, *Tokukai* 2002-287045 (publication date: Oct. 3, 2002)

However, according to the microswitch of publication 2, the rocking plate 81 (which has a narrow-plate shape) must perform up-and-down movement, using the beam 84 as an axis of rotation. Therefore, the beam 84 must have a small diameter. This means that the strength of the beam 84 cannot be increased.

As a result, the microswitch has a drawback that, since the beam 84 is fragile, the life of the microswitch is short.

SUMMARY OF THE INVENTION

The present invention was made to solve the foregoing conventional problem. An object of the present invention is therefore to provide an electrostatic actuator with which a long-life microswitch can be formed.

To attain the foregoing object, an electrostatic actuator of the present invention (hereinafter "the present actuator") is an electrostatic actuator in which a rocking plate is electrostatically attracted by an adsorption electrode provided on a substrate, the electrostatic actuator including: a plurality of supporting columns, which are fixed on the substrate and arranged in a line, for pivotally supporting the rocking plate.

The present actuator is an electrostatic actuator (electrostatic microactuator), which is a MEMS technology. The electrostatic actuator is a structure that moves a movable section (the rocking plate) by means of electrostatic force.

Thus, the present actuator has the rocking plate provided above the substrate, and has the adsorption electrodes provided on a surface of the substrate so as to generate electrostatic force. The adsorption electrodes attract (tilt) the rocking plate to the substrate by means of the electrostatic force (attracting force) thereof. In this way, a switching function or the like function is attained.

In particular, the present actuator has the plurality of supporting columns arranged in a line on the substrate, and the rocking plate is provided on the plurality of supporting columns.

In other words, the present actuator is designed so that the rocking plate is pivoted by (pivotally mounted on) the plurality of supporting columns. Therefore, the rocking plate is designed to tilt toward both sides of the line of supporting columns.

Thus, the present actuator is arranged so that the rocking plate is pivoted by the supporting columns. Therefore, if the present actuator is applied to a microswitch or a micro optical switch, it is not necessary to provide a narrow beam for the rocking plate. As a result, it is possible to prolong the life of the switch.

For a fuller understanding of the nature and advantages of the invention, reference should be made to the ensuing detailed description taken in conjunction with the accompanying drawings.

DESCRIPTION OF THE EMBODIMENTS

Figure 1:
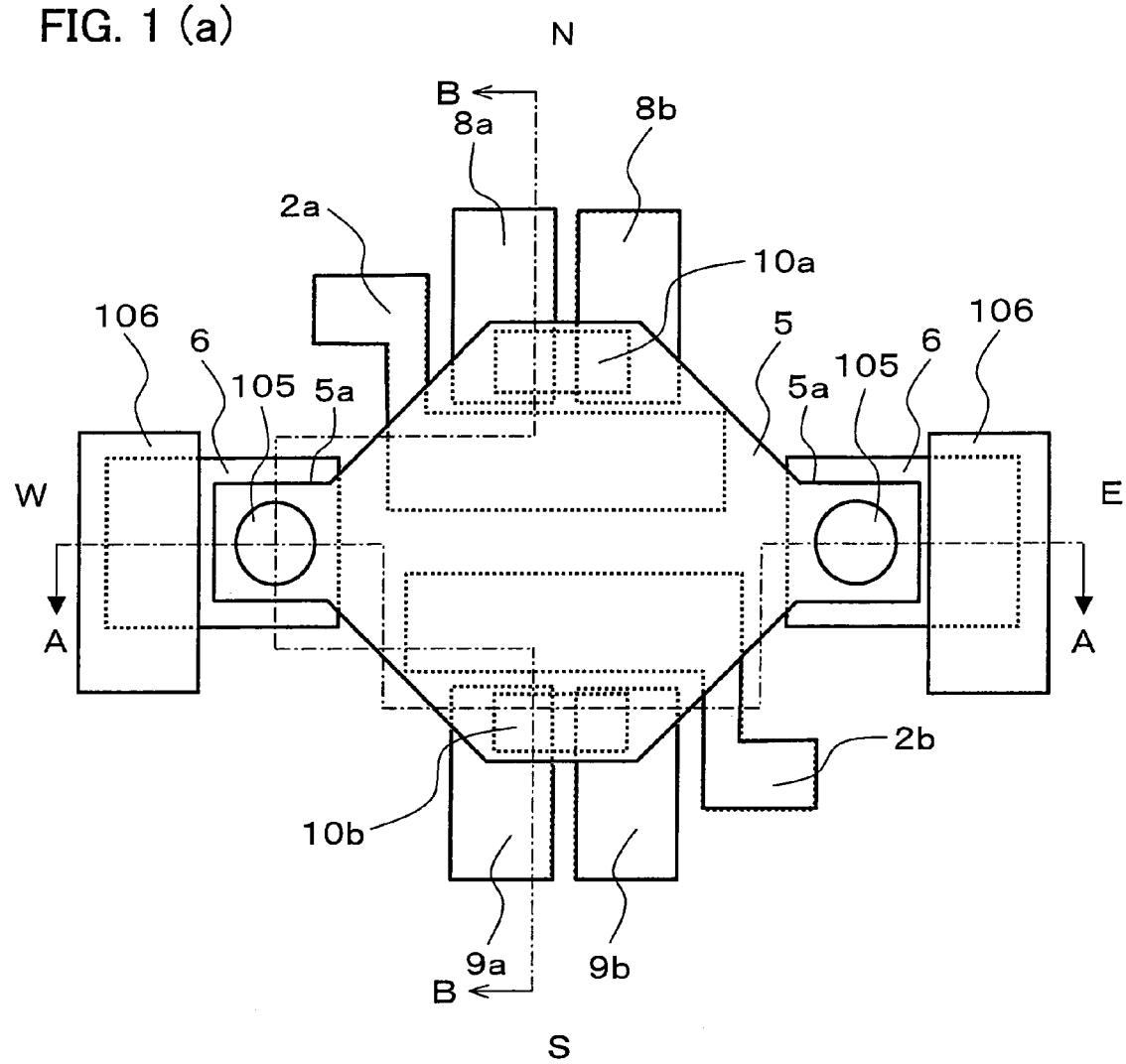
FIG. 1(a) is an overhead view illustrating an arrangement of a microswitch in accordance with one embodiment of the present invention.
FIG. 1(b) is a cross-sectional view taken along line A-A in FIG. 1(a).
Figure 1:
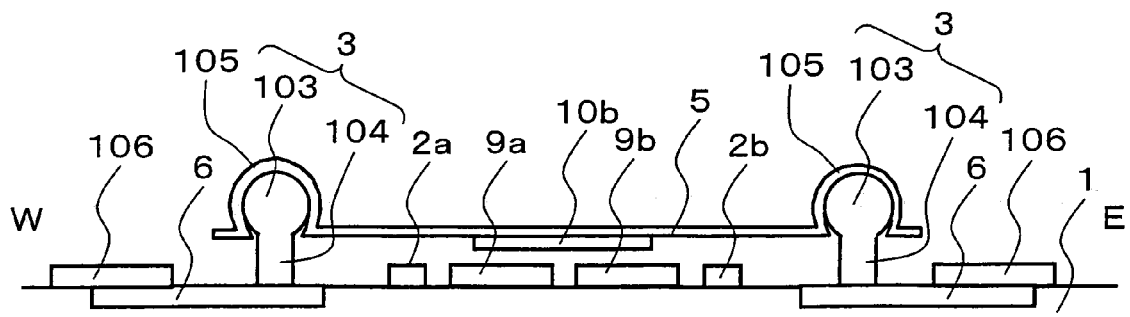

The following describes one embodiment of the present invention.

A microswitch of the present embodiment (hereinafter "the present switch") is a switch using an electrostatic actuator (electrostatic microactuator), which is a MEMS technology. For example, the present switch is used in an electronic device, such as a portable phone (wireless communication device).

The electrostatic actuator is a structure that moves a movable section by means of electrostatic force. The present switch drives a movable section (a rocking plate 5; described later) by means of electrostatic force. The movable section is provided in order to switch switching states (open/closed states of a switch circuit).

FIG. 1(a) is an overhead view illustrating an arrangement of the present switch. FIG. 1(b) is a cross-sectional view taken along line A-A of FIG. 1(a).

On a substrate 1, which is a semiconductor made of silicon, the present switch has two supporting columns 3, a rocking plate 5, signal line electrodes 8a, 8b, and 9a, 9b, adsorption electrodes 2a and 2b, contact electrodes 10a and 10b, diffusion layers 6, and drawing electrodes 106, as shown in FIGS. 1(a) and 1(b).

The diffusion layers 6 are low-resistance portions electrically connected to those portions of the surface of the substrate 1 where the supporting columns 3 are provided. The diffusion layers 6 are made by performing ion implantation into predetermined portions of the substrate 1. Each diffusion layer 6 is grounded at one end through a drawing electrode (drawn circuit) 106, so that its potential is fixed.

Each supporting column 3 has a column capital portion 103 having a spherical shape and a leg portion 104 having a cylindrical shape. The leg portion 104 supports the column capital portion 103. The supporting column 3 stands on a diffusion layer 6 of the substrate 1 by means of the leg portion 104.

The column capital portion 103 has a diameter larger than that of the leg portion 104. Both the column capital portion 103 and the leg portion 104 are made of phosphorus-containing polycrystalline silicon, which is a conductive material.

The rocking plate 5 is made of tungsten nitride, which is a conductive material. The rocking plate 5 is a square-shaped plate having four corners directed in four directions N, S, W, and E, as shown in FIG. 1(a). Among the corners of the rocking plate 5, the corners on one diagonal line (corners in the N-direction and S-direction) are cut off, and the other two corners (corners in the W-direction and E-direction) are provided with extended portions 5a, respectively. On the extended portions 5a, cap domes 105 are provided, respectively. The cap domes 105 are also made of tungsten nitride.

At the cap domes 105, the rocking plate 5 is supported by (pivoted by; pivotally mounted on) the supporting columns 3. Each cap dome (domed portion) 105 is hollow, has a spherical shape with a missing portion, and protrudes from the rocking plate 5 (extended portion 5a). The inner wall of each cap dome 105 has a spherical surface shape (a shape of a portion of a sphere).

At the edges of the rocking plate 5 in the vicinity of the corners in the N-direction and S-direction at which the extended portions 5a are not provided (the corners that are cut off), the contact electrodes 10a and 10b are provided on the lower surface (the surface facing the substrate 1; the bottom surface). The contact electrodes 10a and 10b are low-resistance wires.

The rocking plate 5 having the foregoing arrangement is provided on the supporting columns 3 in such a manner that each cap dome 105 surrounds (covers) the column capital portion 103 of the corresponding supporting column 3. That is, the rocking plate 5 is provided on the supporting columns 3 in such a manner that each cap dome 105 and the corresponding column capital portion 103 are engaged with one another. Thus, the rocking plate 5 can rock on the supporting columns 3, which function as a pivot (support).

According to the present switch, each column capital portion 103 contacts the inner wall of the corresponding cap dome 105, and the rocking plate 5 is pivoted on contact portions. When the rocking plate 5 tilts (rocks), the inner wall of each cap dome 105 slides on the corresponding column capital portion 103.

The signal line electrodes 8a, 8b and 9a, 9b, and the adsorption electrodes 2a and 2b are electrodes provided below the rocking plate 5 (on the surface of the substrate 1).

The signal line electrodes 8a and 8b are a pair of signal line electrodes provided below the rocking plate 5 in the N-direction (below the contact electrode 10a). Likewise, the signal line electrodes 9a and 9b are a pair of electrodes provided below the rocking plate 5 in the S-direction (below the contact electrode 10b).

According to the present switch, when one of the two pairs of signal line electrodes 8a, 8b and 9a, 9b (the pairs are respectively provided in the two directions) is short-circuited, the pair is electrically connected. As a result, the pair is enabled to transmit a signal. That is, according to the present switch, it is possible to switch two kinds of switching states by selectively enabling one of the two pairs of signal line electrodes 8a, 8b and 9a, 9b to transmit a signal.

Thus, in the present switch, the signal line electrodes 8a, 8b and 9a, 9b function as switching circuits whose ON/OFF states are switched.

As shown in FIG. 1(b), the height of the signal line electrodes 8a, 8b and 9a, 9b is such that, when the rocking plate 5 tilts, the contact electrodes 10a or 10b provided on the rocking plate 5 contacts the signal line electrodes 8a, 8b or 9a, 9b. Therefore, when the rocking plate 5 tilts in the N-direction or S-direction, the signal line electrodes 8a, 8b or 9a, 9b provided in that direction are short-circuited by the contact electrode 10a or 10b provided on the rocking plate 5.

On the substrate 1, the adsorption electrodes 2a and 2b are provided in such positions that are closer to the center of the rocking plate 5 than the signal line electrodes 8a, 8b and 9a, 9b. The adsorption electrode 2a is provided on the side of the signal line electrodes 8a, 8b (on the N-side), and the adsorption electrode 2b is provided on the side of the signal line electrodes 9a, 9b (on the S-side).

The adsorption electrodes 2a and 2b can be charged positively or negatively by the control of adsorption electrode control circuits, which are described later. Thus, the adsorption electrodes 2a and 2b electrostatically attracts the rocking plate 5 (or the contact electrodes 10a, 10b) and thereby tilts the rocking plate 5. As a result, the signal line electrodes 8a, 8b or 9a, 9b are short-circuited.

Described next is how the adsorption electrodes 2a and 2b drive (rock) the rocking plate 5.

FIG. 2(a) is a cross-sectional view taken along line B-B of FIG. 1(a). In FIG. 2(a), neither the adsorption electrode 2a nor the adsorption electrode 2b is charged. In this case, the rocking plate 5 keeps its balance on the supporting columns 3 (that is, the rocking plate 5 is not tilted in any direction) as long as the substrate 1 remains horizontal. Therefore, the contact electrodes 10a and 10b provided on the rocking plate 5 remain detached from the signal line electrodes 8a, 8b and 9a, 9b.

Such a state of equilibrium of the rocking plate 5 can be attained also by respectively applying equivalent charges (electrostatic forces) to the two adsorption electrodes 2a and 2b, which are line-symmetrical to one another with respect to the supporting columns 3.

FIG. 2(b) is a cross-sectional view taken along line B-B of FIG. 1(a). In FIG. 2(b), the voltage at the adsorption electrode 2b, which is provided in the S-direction, is increased by the control circuit, so as to apply charge to the adsorption electrode 2b. In this case, as shown in FIG. 2(b), electrostatic attracting force (adsorption force) is generated between the rocking plate 5 and the adsorption electrode 2b, and the rocking plate 5 tilts in the S-direction. As a result, the contact electrode 10b contacts the signal line electrodes 9a and 9b, thereby short-circuiting (conducting) the signal line electrodes 9a and 9b.

FIG. 2(c) is a cross-sectional view taken along line B-B of FIG. 1(a). In FIG. 2(b), the voltage at the adsorption electrode 2a, which is provided in the N-direction, is increased by the control circuit, so as to apply charge to the adsorption electrode 2a. In this case, electrostatic attracting force (adsorption force) is generated between the rocking plate 5 and the adsorption electrode 2a, and the rocking plate 5 tilts in the N-direction. As a result, the contact electrode 10a contacts the signal line electrodes 8a and 8b, thereby short-circuiting (conducting) the signal line electrodes 8a and 8b.

As described above, the present switch is structured by providing the two supporting columns 3 on the substrate 1, and providing the rocking plate 5 on the supporting columns 3 so that the rocking plate 5 is pivoted by (pivotally mounted on) the supporting columns 3 at two positions. The rocking plate 5 is made of conductive material, so as to be subjected to the electrostatic force of the adsorption electrodes 2a and 2b.

Thus, according to the arrangement of the present switch, the supporting columns 3 pivotally support the rocking plate 5. Therefore, tilting directions of the rocking plate 5 (rocking directions; directions into which the adsorption electrode 2a or 2b attracts the rocking plate 5 toward the substrate 1) can be set freely.

Moreover, since the present switch is arranged so that the supporting columns 3 pivotally support the rocking plate 5, it is not necessary to provide a narrow beam in order to support the rocking plate 5. Therefore, the present switch is a long-life microswitch.

In the present switch, each supporting column 3 has the leg portion 104 (which is fixed on the substrate 1) and the column capital portion 103 (which is provided on the leg portion 104). The column capital portion 103 is wider than the leg portion 104.

The rocking plate 5 has the two cap domes 105, each of which is hollow. Each cap dome 105 is engaged with the column capital portion 103 of the corresponding supporting column 3 in such a manner as to surround (as to be pivoted by) the column capital portion 103.

According to this arrangement, it is easy to tilt the rocking plate 5 in a desired direction (the N-direction or the S-direction), by using the supporting columns 3 as a fulcrum. In addition, it is possible to prevent the rocking plate 5 from being separated (detached) from the supporting columns 3.

According to the present switch, the inner wall of each cap dome 105 has a spherical surface shape, and a contact portion (a portion that contacts the corresponding cap dome 105) of the column capital portion 103 of each supporting column 3 has a spherical surface shape. With this arrangement, the rocking plate 5 can rock (slide) easily on the column capital portion 103.

In the present switch, the two contact electrodes 10a and 10b are provided at the edges of the rocking plate 5 in the two directions (the N-direction and the S-direction), respectively. With these two contact points, two states can be switched by the single switch.

In the present switch, the rocking plate 5 is in a half-fixed state by being pivoted by the supporting columns 3. With this arrangement, it is possible to rock the rocking plate 5 without increasing the voltage applied to the adsorption electrode 2a or 2b.

Moreover, since spring property of the rocking plate 5 is not utilized (in other words, the rocking plate 5 is not bent), it is possible to decrease structural damage to and changes over time of the rocking plate 5, thereby enhancing long-term reliability.

With reference to FIGS. 4 to 12, the following describes a method of manufacturing the present switch.

Figure 4:
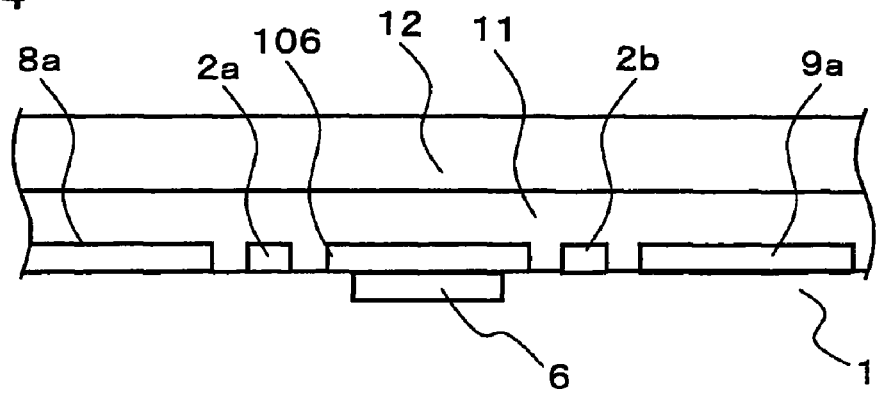
FIG. 4 is an explanatory diagram illustrating a manufacturing step for the microswitch shown in FIGS. 1(a) and 1(b).

First, as shown in FIG. 4, a diffusion layer 6 and a drawing electrode 106 are formed on the substrate 1 by ion implantation or the like method. The diffusion layer 6 is a low-resistance region, and the substrate 1 is a semiconductor made of silicon. Then, on the substrate 1, the signal line electrodes 8a, 8b and 9a, 9b, the adsorption electrodes 2a and 2b, and wires (not shown) for controlling the signal line electrodes 8a, 8b and 9a, 9b, and the adsorption electrodes 2a and 2b are formed.

Thereafter, two layers are laminated (two films are formed). The two layers (films) are a first insulating film (photoresist film) 11 and a second insulating film (photoresist film) 12, which are made of resin (e.g. photoresist). The signal line electrodes 8a, 8b and 9a, 9b, and the adsorption electrodes 2a and 2b can be formed by employing an evaporation or spattering method for film-formation, and then employing a liftoff method (or an etching method).

Figure 5:
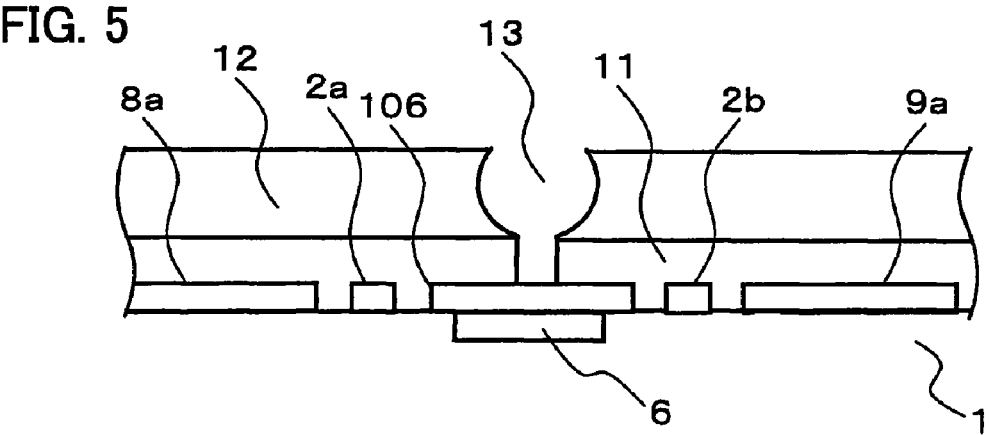
FIG. 5 is an explanatory diagram illustrating a manufacturing step for the microswitch shown in FIGS. 1(a) and 1(b).

Next, as shown in FIG. 5, an opening (opening portion) 13 is formed in the first insulating film 11, by an ordinary photolithography method. Before performing photolithography, first, light is radiated onto the insulating films 11 and 12 under an exposure condition that the light is not dispersed with respect to a mask (first exposure). Then, heat processing is performed. Next, light is radiated onto the second insulating film 12 under an exposure condition that the light is dispersed with respect to the mask (second exposure). By subsequently performing development, the opening 13 is formed. The opening 13 is narrow on the bottom of the resist layers, and is wide on the surface of the resist layers. The opening 13 has a round shape (on the surface of the resist layers).

Figure 6:
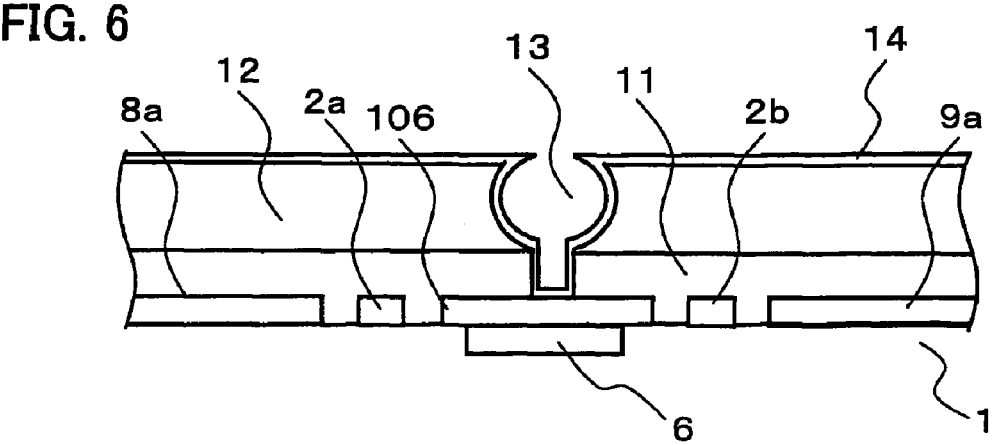
FIG. 6 is an explanatory diagram illustrating a manufacturing step for the microswitch shown in FIGS. 1(a) and 1(b).

Next, as shown in FIG. 6, a power-supply metal layer (e.g. titanium/gold) 14 is formed by an evaporation or the like method, so as to cover the surface of the second insulating film 12 and the inner surface of the opening 13.

Figure 7:
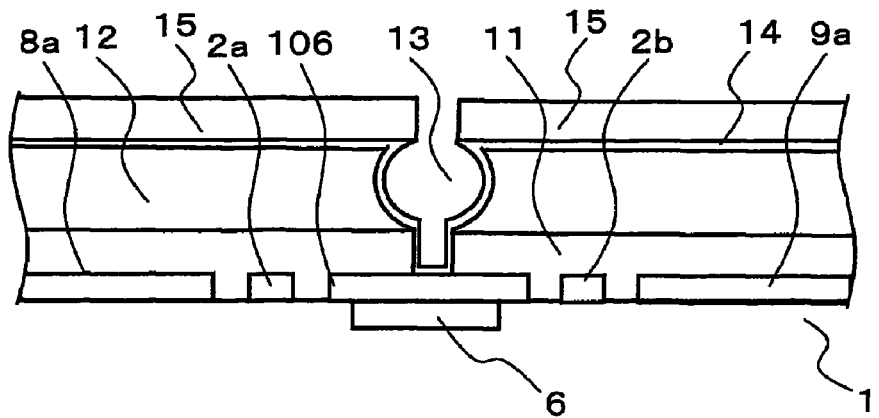
FIG. 7 is an explanatory diagram illustrating a manufacturing step for the microswitch shown in FIGS. 1(a) and 1(b).

Next, as shown in FIG. 7, a photoresist mask 15 is formed by an ordinary photolithography step, on the power-supply metal layer 14 provided on the second insulating film 12.

Figure 8:
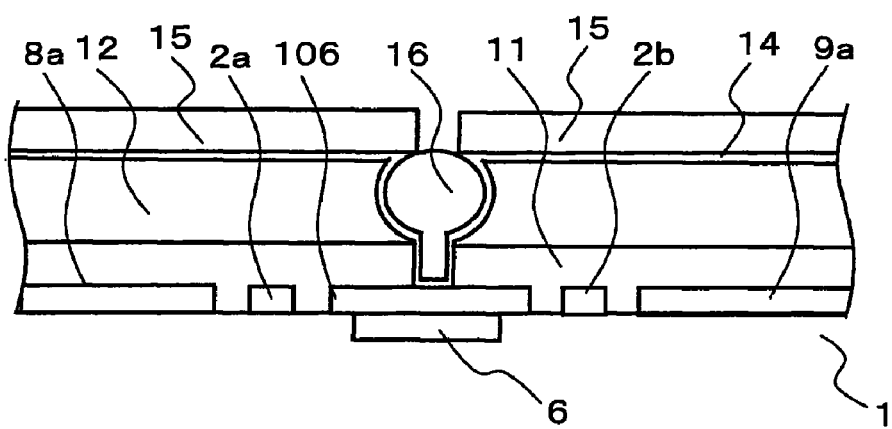
FIG. 8 is an explanatory diagram illustrating a manufacturing step for the microswitch shown in FIGS. 1(a) and 1(b).

Next, as shown in FIG. 8, gold plating is performed through the photoresist mask 15, by an electroplating or the like method. In this way, metal can be grown in the opening 13 so as to form a metal column 16 made of gold. The metal used in the plating may be nickel or copper, instead of gold.

Figure 9:
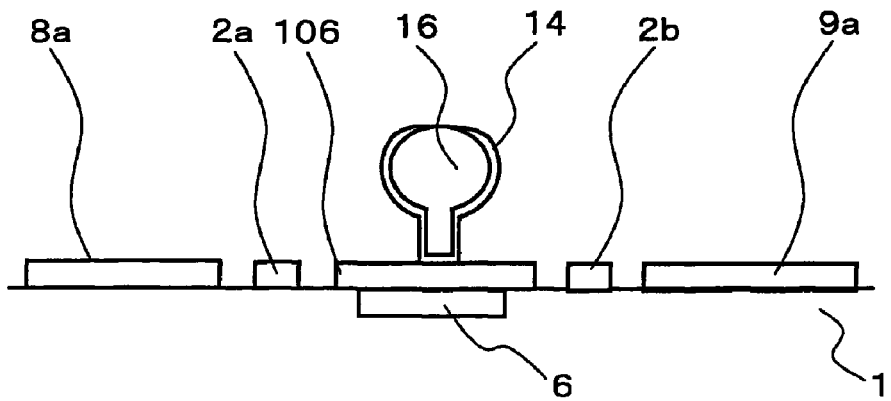
FIG. 9 is an explanatory diagram illustrating a manufacturing step for the microswitch shown in FIGS. 1(a) and 1(b).

Next, as shown in FIG. 9, the photoresist mask 15, the power-supply metal layer 14, and the second insulating film 12 are removed, so as to form a supporting column 3, in which the metal column (gold) 16 is covered with the power-supply metal layer 14. As a result, the metal column (gold) 16 becomes the supporting column 3 having the column capital portion 103 and the leg portion 104.

Figure 10:
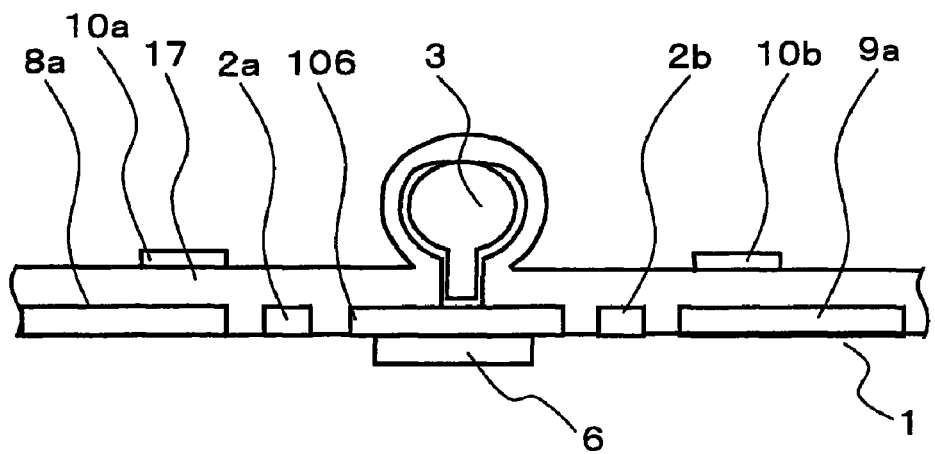
FIG. 10 is an explanatory diagram illustrating a manufacturing step for the microswitch shown in FIGS. 1(a) and 1(b).

Next, as shown in FIG. 10, as a sacrificial film (sacrificial layer) 17, an organic film (photoresist film) is formed by a rotation paint or the like method. On the sacrificial film 17, contact metal (e.g. titanium/gold) is formed by employing the evaporation or spattering method, and patterned into predetermined positions by the liftoff method (or etching), so as to form the contact electrodes 10a and 10b.

Figure 11:
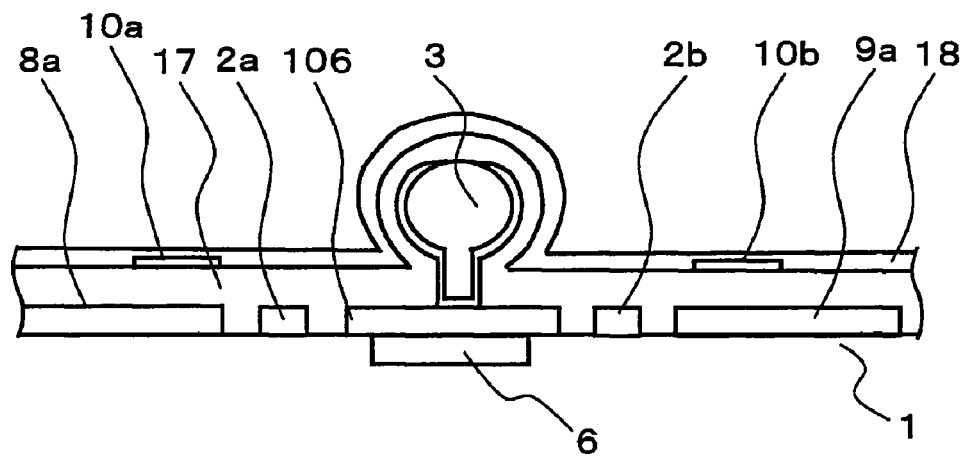
FIG. 11 is an explanatory diagram illustrating a manufacturing step for the microswitch shown in FIGS. 1(a) and 1(b).

Next, as shown in FIG. 11, a metal layer (e.g. a tungsten nitride film) 18 is formed on the sacrificial film 17 and the contact electrodes 10a and 10b by the spattering or the like method.

Figure 12:
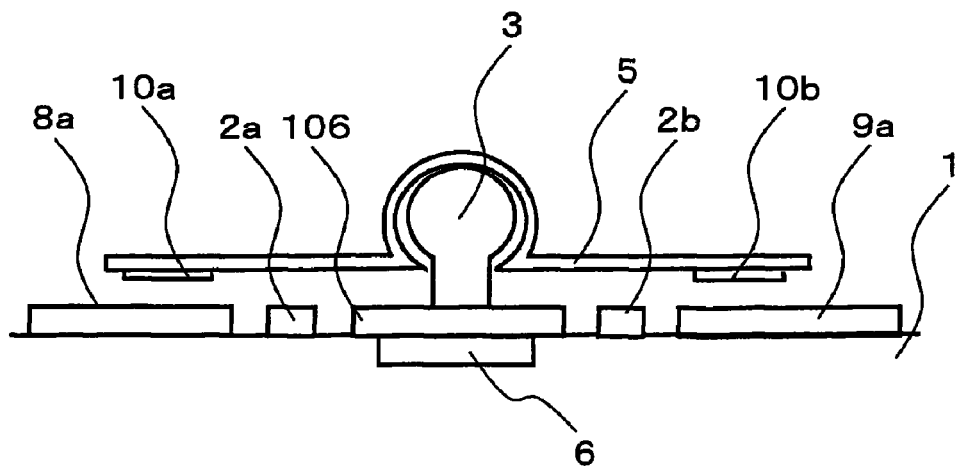
FIG. 12 is an explanatory diagram illustrating a manufacturing step for the microswitch shown in FIGS. 1(a) and 1(b).

Next, as shown in FIG. 12, the metal layer 18 is etched and patterned by, for example, a reactive etching method, which is a dry etching method.

After that, the sacrificial film 17, which is a photoresist film, is removed by oxygen plasma processing or by an organic solvent. If the sacrificial film 17 is an inorganic film (e.g. a silicon nitride film), the sacrificial film 17 can be removed by, for example, a wet etching method using an aqueous solution of hydrogen fluoride, or by the dry etching method.

In this way, the cap dome (joint portion) 105 of the rocking plate 5 is formed so as to cover the supporting column 3. In other words, the rocking plate 5 is provided on the supporting column (column material) 3. The manufacture of the present switch shown in FIGS. 1(*a*) and 1(*b*) is thus completed. In FIG. 9, the power-supply metal layer 14 is not shown.

Thus, the present switch can be manufactured by performing semiconductor processing on the single substrate 1. Therefore, manufacturing steps can be simplified, and the present switch can be miniaturized easily.

In the present embodiment, the two pairs of signal electrodes 8a, 8b and 9a, 9b are provided in the N-direction and S-direction, respectively. However, instead of this arrangement, four signal line electrodes may be provided in each of the N-direction and S-direction. That is, four signal line electrodes 8a to 8d may be provided in the N-direction, and four signal line electrodes 9a to 9d may be provided in the S-direction.

According to this arrangement, the signal line electrodes 8a to 8d (signal line electrodes 9a to 9d) can be electrically connected by the contact electrode 10a, by tilting the rocking plate 5 in the N-direction (S-direction). Therefore, it is possible to increase the number of states that can be switched.

In the present embodiment, two kinds of switching states are switched by short-circuiting one of the two pairs of signal electrodes 8a, 8b and 9a, 9b (the pairs are provided in the N-direction and S-direction, respectively), thereby electrically connecting the pair of signal electrodes 8a, 8b or 9a, 9b. Such short-circuit is necessary if the signal transmitted between the pair of signal line electrodes 8a, 8b or 9a, 9b is a direct current signal (DC signal).

However, if the signal outputted to the pair of signal line electrodes 8a, 8b or 9a, 9b is a radio frequency signal (RF signal), it is possible to electrically connect the pair of signal line electrodes 8a, 8b or 9a, 9b to perform signal transmission, if a dielectric material (capacitor) is provided therebetween. In this case, it is not necessary to short-circuit the pair of signal line electrodes 8a, 8b or 9a, 9b.

Figure 13:
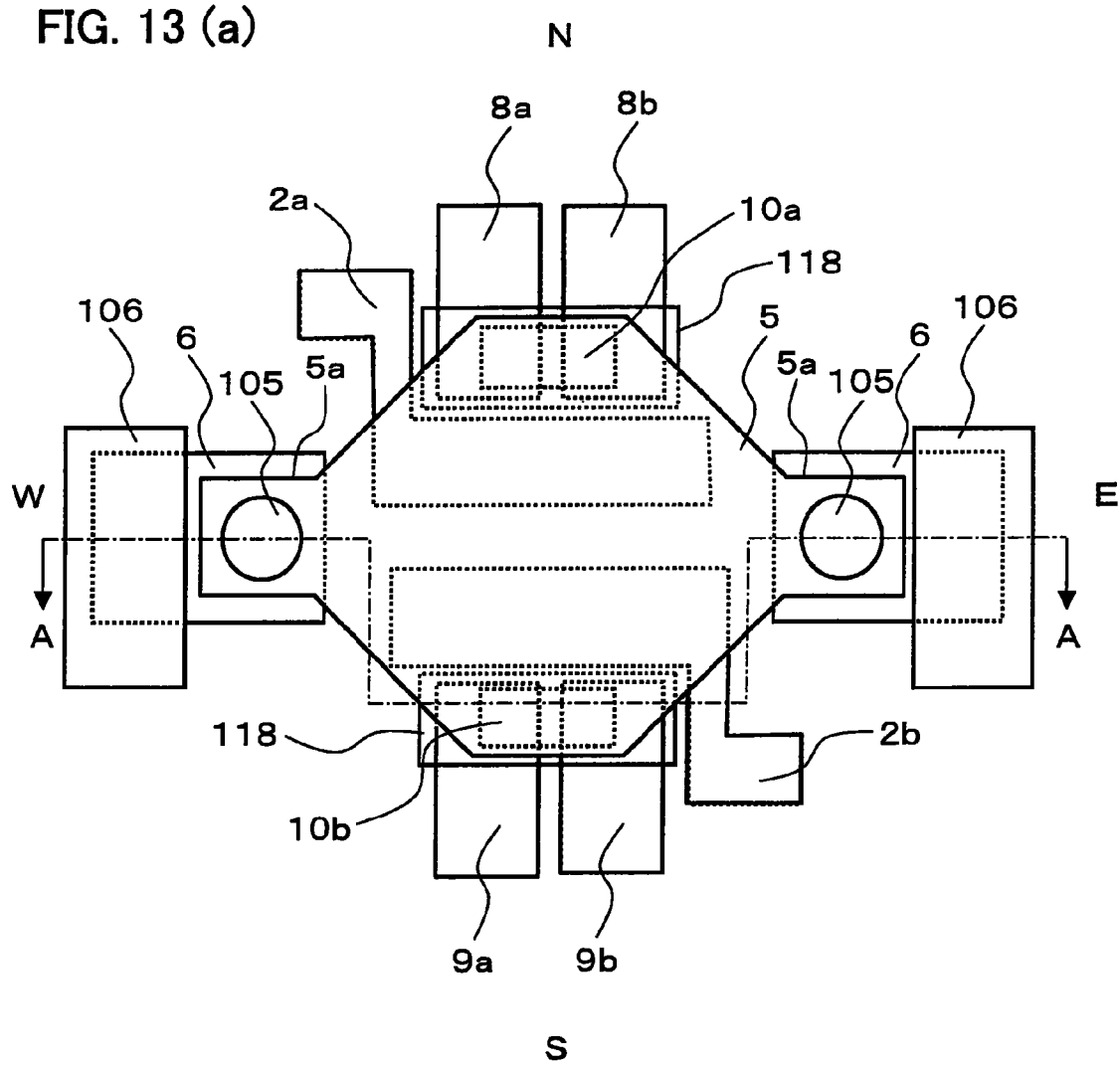
FIG. 13(a) is an overhead view illustrating the microswitch shown in FIGS. 1(a) and 1(b) including dielectric films.
FIG. 13(b) is a cross-sectional view, taken along line A-A, of the microswitch shown in FIG. 13(a).
Figure 13:
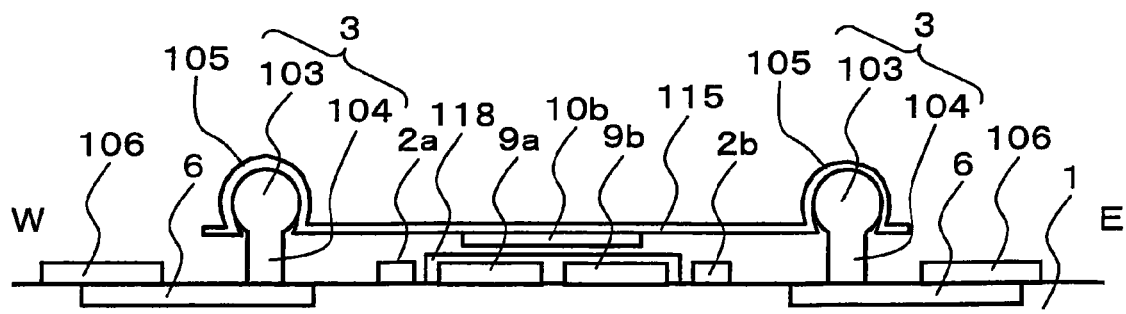

FIG. 13(*a*) is an overhead view illustrating an arrangement of the present switch to perform such signal transmission. FIG. 13(*b*) is a cross-sectional view taken along line A-A of FIG. 13(*a*).

As shown in FIGS. 13(*a*) and 13(*b*), according to this arrangement, a dielectric film 118 is provided on a surface of each pair of signal line electrodes 8a, 8b and 9a, 9b (the pairs are provided in the two directions, respectively). The dielectric film 118 is a silicon nitride film, a titanium oxide film, or a tantalum oxide film, for example.

With this arrangement, switching operation (signal transmission between a pair of the signal line electrodes 8a, 8b or 9a, 9b) can be attained by causing the dielectric film 118 to contact the pair of signal line electrodes 8a, 8b or 9a, 9b.

The dielectric film 118 may be provided not on the surface of each pair of signal line electrodes 8a, 8b and 9a, 9b, but on a surface of each of the contact electrodes 10a and 10b provided on the rocking plate 5. Alternatively, the dielectric film 118 may be provided both on the surface of each of the contact electrodes 10a and 10b, and on the surface of each pair of signal line electrodes 8a, 8b and 9a, 9b.

Depending on a frequency of the RF signal, its is possible to electrically connect (for signal transmission) a pair of signal line electrodes 8a, 8b or 9a, 9b by simply moving the contact electrode 10a or 10b closer to the pair of signal line electrodes 8a, 8b or 9a, 9b. In this case, it is not necessary to use the dielectric film 118.

Figure 14:
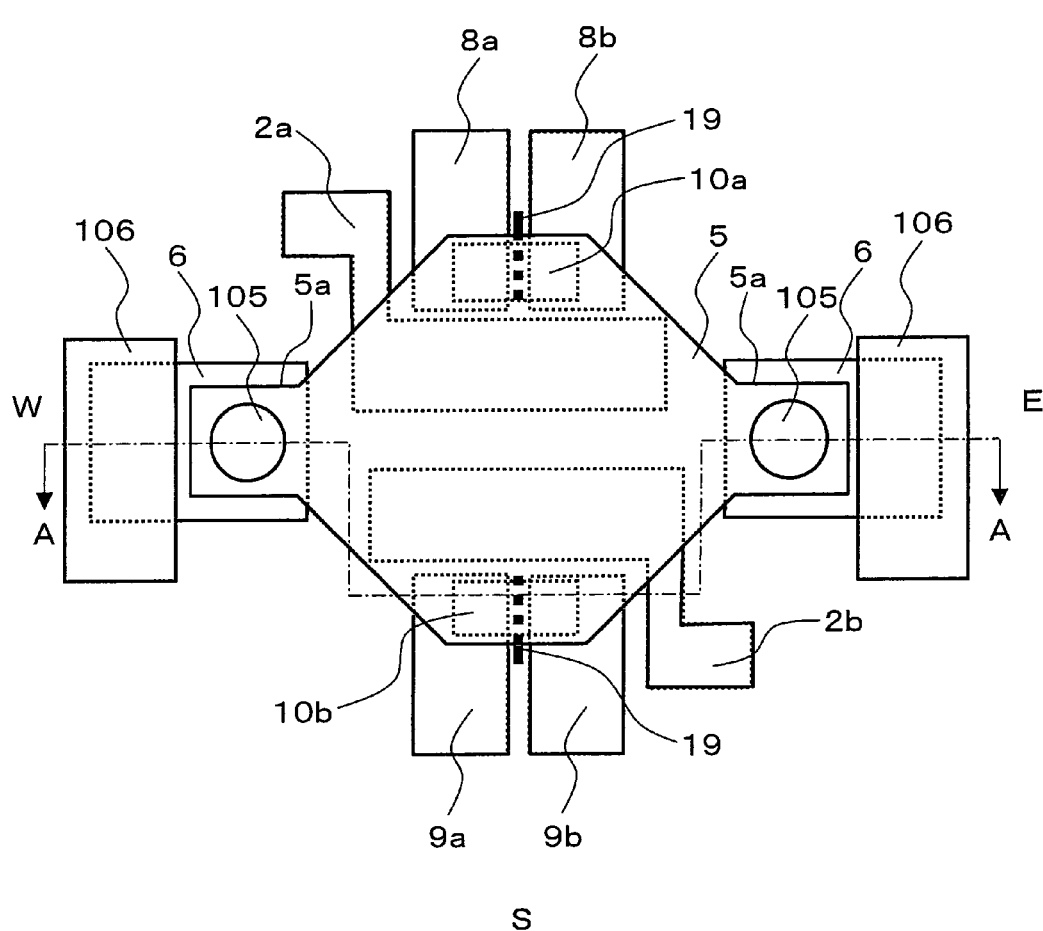
FIG. 14(a) is an overhead view illustrating the microswitch shown in FIGS. 1(a) and 1(b) including a stopper.
FIG. 14(b) is a cross-sectional view, taken along line A-A, of the microswitch shown in FIG. 14(a).
Figure 14:
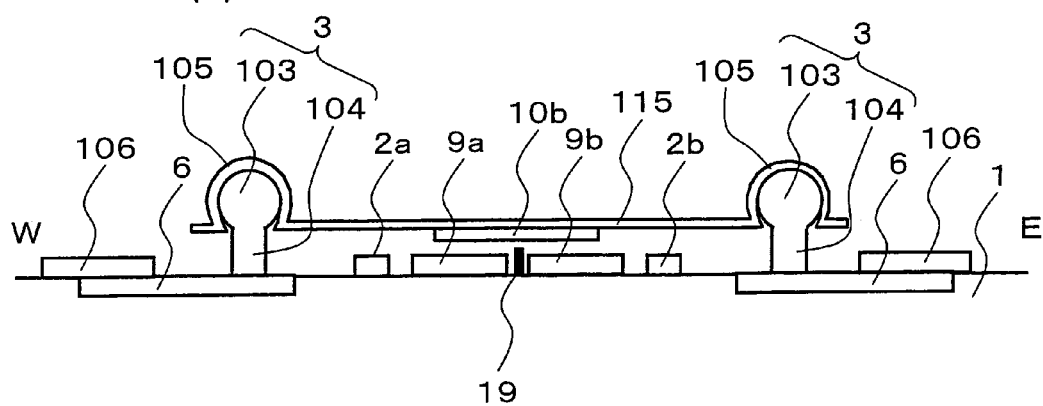

FIG. 14(a) is an overhead view illustrating an arrangement of the present switch to perform such signal transmission. FIG. 14(b) is a cross-sectional view taken along line A-A of FIG. 14(a).

As shown in FIGS. 14(a) and 14(b), according to this arrangement, stoppers (stopper patterns) 19 are provided between the pair of signal line electrodes 8a, 8b and the contact electrode 10a, and between the pair of signal line electrodes 9a, 9b and the contact electrode 10b, on the substrate 1. Each of the stoppers 19 prevents the contact electrode 10a or 10b from contacting the pair of signal line electrodes 8a, 8b or 9a, 9b.

According to this arrangement, when the rocking plate 5 is attracted toward the substrate 1 by the electrostatic force of the adsorption electrode 2a or 2b, the corresponding stepper 19 stops the rocking plate 5. As a result, a very narrow gap is created between the contact electrode 10a or 10b and the corresponding pair of signal line electrodes 8a, 8b or 9a, 9b. This allows for signal transmission between the pair of the signal line electrodes 8a, 8b or 9a, 9b.

As described above, the RF signal can be transmitted by simply providing the dielectric material or the very narrow gap between the contact electrode 10a or 10b and the corresponding pair of signal line electrodes 8a, 8b or 9a, 9b, without short-circuiting the pair of signal line electrodes 8a, 8b or 9a, 9b. As a result, it is possible to attain small loss and high isolation.

In this case, because the thickness of the dielectric material (or the size of the gap) provided between the contact electrode 10a or 10b and the corresponding pair of signal electrodes 8a, 8b or 9a, 9b determines a capacitance value, the thickness (or the size) is important.

The capacitance value needs to be a value suitable for a switching characteristic at the frequency of the signal transmitted. Therefore, the capacitance value varies according to the frequency.

When the metal-made contact electrode 10a or 10b and the corresponding pair of signal line electrodes 8a, 8b or 9a, 9b contact each other, such problems as abrasion and fixation could occur at contact points. However, the abrasion and fixation at the contact points can be prevented by providing, as described above, the dielectric material between the contact electrode 10a or 10b and the corresponding pair of signal line electrodes 8a, 8b or 9a, 9b. Thus, reliability can be enhanced.

If the gap is created between the contact electrode 10a or 10b and the corresponding pair of signal line electrodes 8a, 8b or 9a, 9b as shown in FIGS. 14(a) and 14(b), air (gas) is provided therebetween, instead of the dielectric film 118. In this case, no contact occurs between the contact electrode 10a or 10b and the corresponding pair of signal line electrodes 8a, 8b or 9a, 9b. Therefore, it is possible to completely eliminate the possibility of abrasion and fixation, and thereby enhance reliability further.

In this case, it is preferable if the gap between the contact electrode 10a or 10b and the corresponding pair of signal line electrodes 8a, 8b or 9a, 9b is as narrow as several tens of nanometers, considering dielectric constant of air.

As described above, the present switch can be manufactured by performing semiconductor processing on the single substrate 1.

In addition, on the substrate 1 of the present switch, adsorption electrode control circuits (electrostatic force applying circuits; driving circuits (driving elements)), which are semiconductor elements for respectively controlling (driving) the adsorption electrodes 2a and 2b of the present switch, may also be formed.

Figure 15:
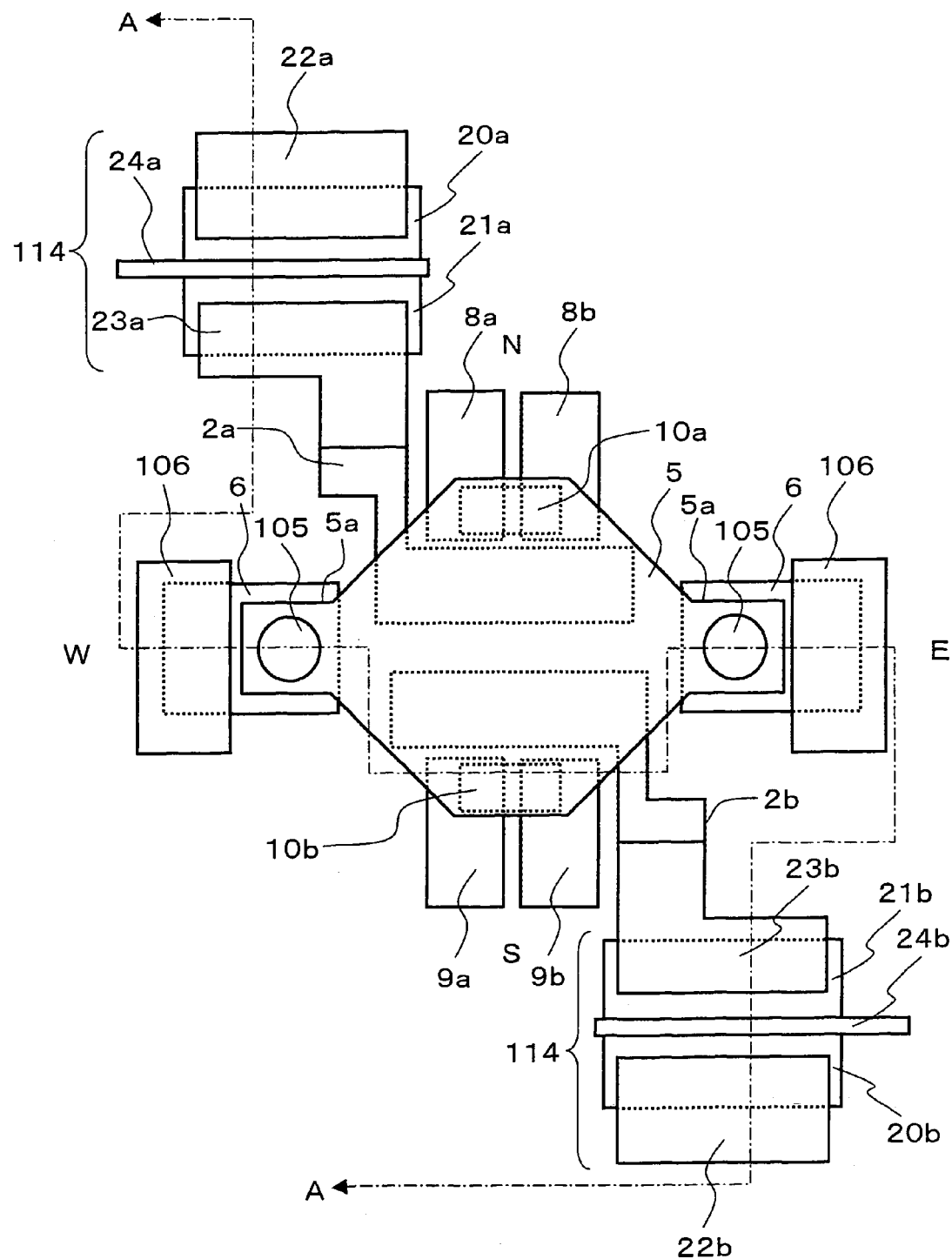
FIG. 15 is an overhead view illustrating an arrangement of the microswitch shown in FIGS. 1(a) and 1(b), where adsorption electrode control circuits for controlling adsorption electrodes are formed on the substrate.
Figure 16:
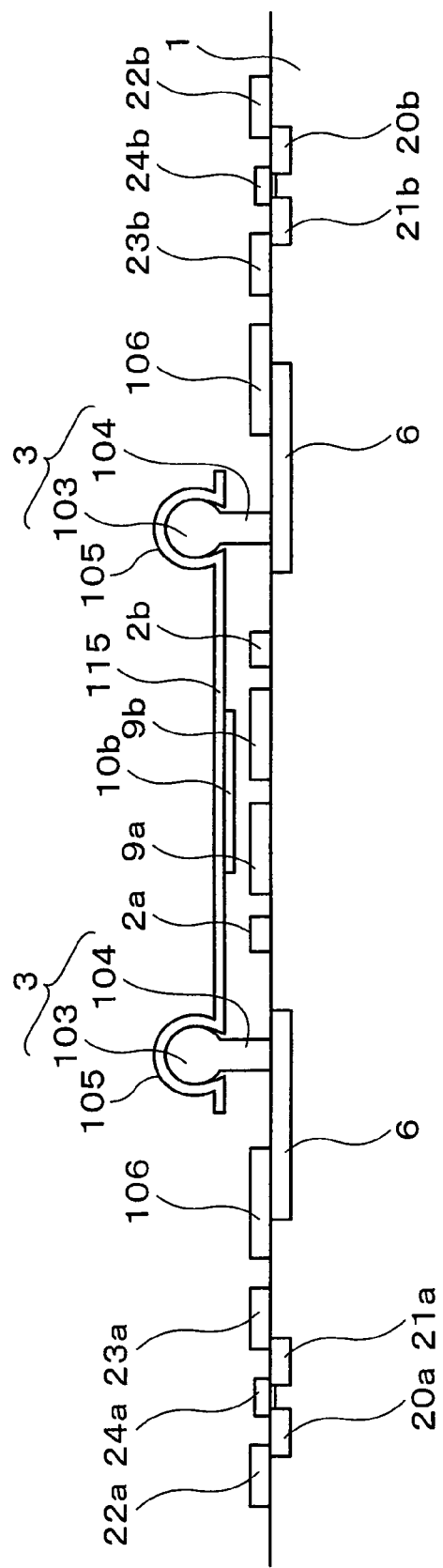
FIG. 16 is a cross-sectional view taken along line A-A of FIG. 15.

FIG. 15 is an overhead view illustrating an arrangement where adsorption electrode control circuits 114 for respectively controlling the adsorption electrodes 2a and 2b are formed on the substrate 1. FIG. 16 is a cross-sectional view taken along line A-A of FIG. 15.

As shown in FIGS. 15 and 16, each of the adsorption electrode control circuits 114 includes a source diffusion layer 21a or 21b, a source electrode 23a or 23b, a gate electrode wire 24a or 24b, a drain diffusion layer 20a or 20b, and a drain electrode 22a or 22b.

Figure 17:
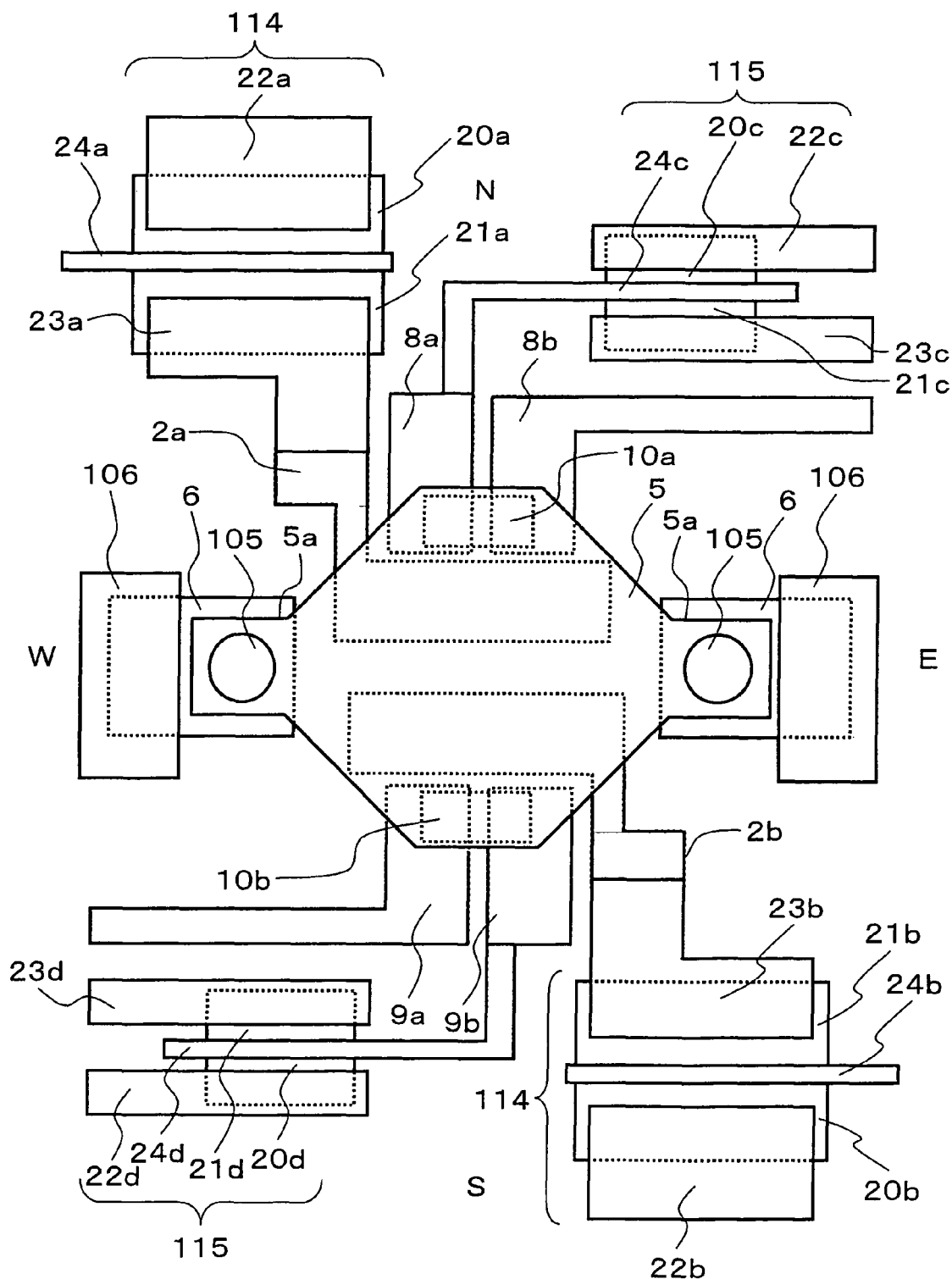
FIG. 17 is an overhead view illustrating an arrangement of FIG. 15 further provided with signal circuits.

In addition, as shown in FIG. 17, signal circuits (e.g. radio frequency (RF) circuits) 115 respectively connected to the two pairs of signal line electrodes 8a, 8b and 9a, 9b may be formed on the substrate 1 of the present switch.

Like the adsorption electrode control circuits 114, each of the signal circuits 115 includes a source diffusion layer 21c or 21d, a source electrode 23c or 23d, a gate electrode wire 24c or 24d, a drain diffusion layer 20c or 20d, and a drain electrode 22c or 22d.

By thus integrating the present switch with the adsorption electrode control circuits 114 and the signal circuits 115, these circuits can be mounted on a single chip. Therefore, only small area is required in order to mount these circuits on a printed circuit. As a result, it is possible to attain miniaturization and cost reduction of a device including the present switch.

In the foregoing explanation, the adsorption electrode control circuits 114 and the signal circuits 115 are FET elements. However, the same effects (miniaturization and cost reduction) can be attained by using C-MOS, HBT, or other semiconductor elements to form the adsorption electrode control circuits 114 and the signal circuits 115.

If other semiconductor elements (e.g. amplifiers) are provided on the substrate 1 in addition to the adsorption electrode control circuits 114 and the signal circuits 115, further miniaturization and cost reduction can be attained.

As shown in FIGS. 18(a) and 18(b), the present switch may have a through hole 25 provided at a part of each cap dome 105 of the rocking plate 5. The through hole 25 can be formed easily in patterning the rocking plate 5.

With this arrangement, in the step of removing the sacrificial film 17 shown in FIG. 11, etchant can be injected through the through hole 25. Therefore, the sacrificial film 17 can be removed efficiently.

Figure 18:
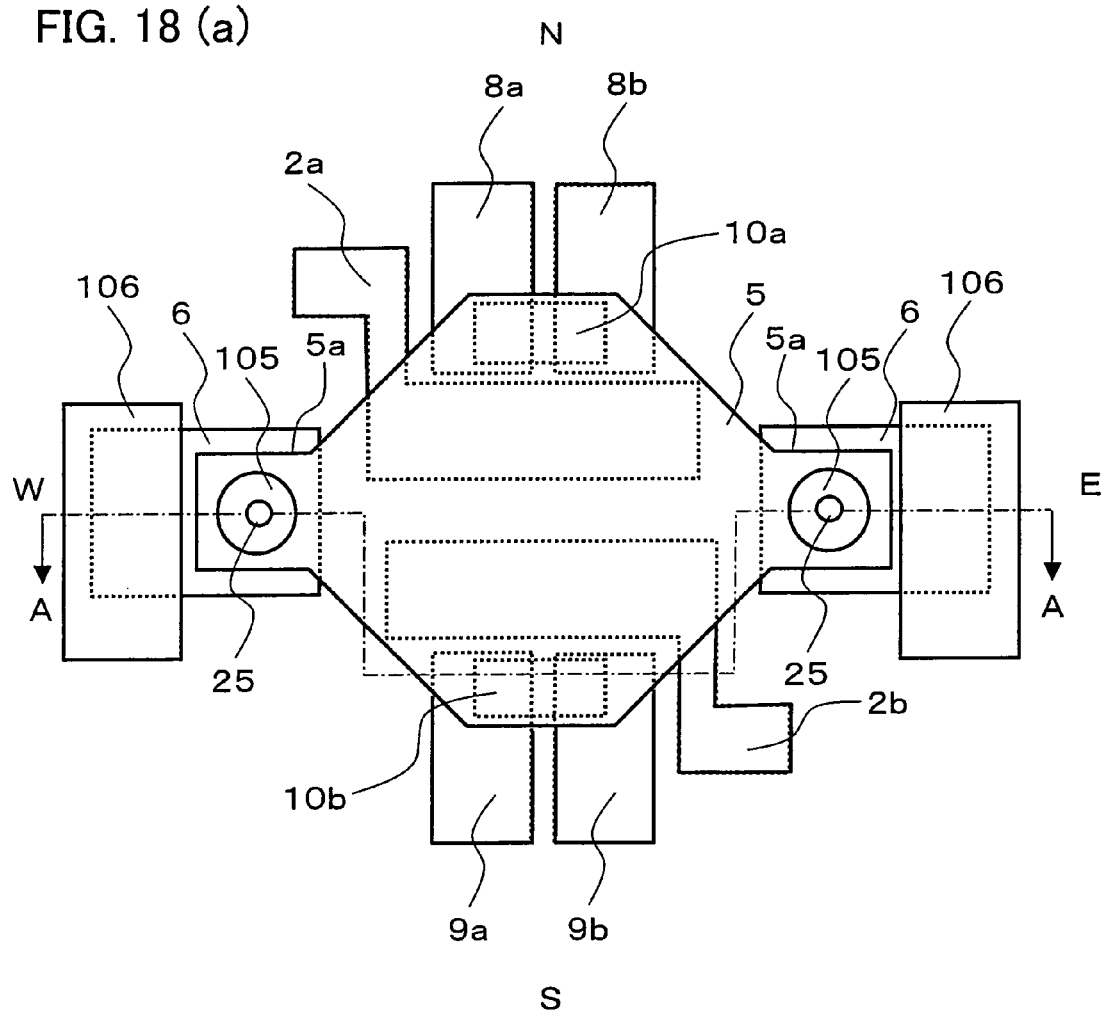
FIG. 18(a) is an overhead view illustrating the microswitch of FIGS. 1(a) and 1(b) in which each cap dome of the rocking plate has a through hole.
FIG. 18(b) is a cross-sectional view, taken along line A-A, of the microswitch shown in FIG. 18(a).
Figure 18:
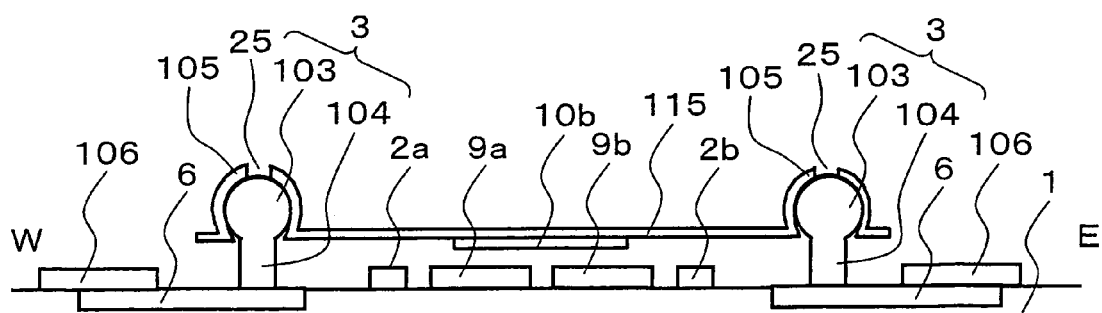

In the example shown in FIGS. 18(*a*) and 18(*b*), one through hole 25 is provided on top of each cap dome 105. However, as long as the rocking of the rocking plate 5 is not hampered, the through hole 25 may be provided at any part of the rocking plate 5, and the number of the through hole 25 is not limited.

In the present embodiment, the column capital portion 103 of each supporting column 3 has a spherical shape. However, it is not necessary that the column capital portion 103 as a whole has a spherical shape, as long as a contact portion (a portion that contacts the cap dome 105) of the column capital portion 103 has a spherical surface shape (a shape that is a part of a sphere).

Figure 19:
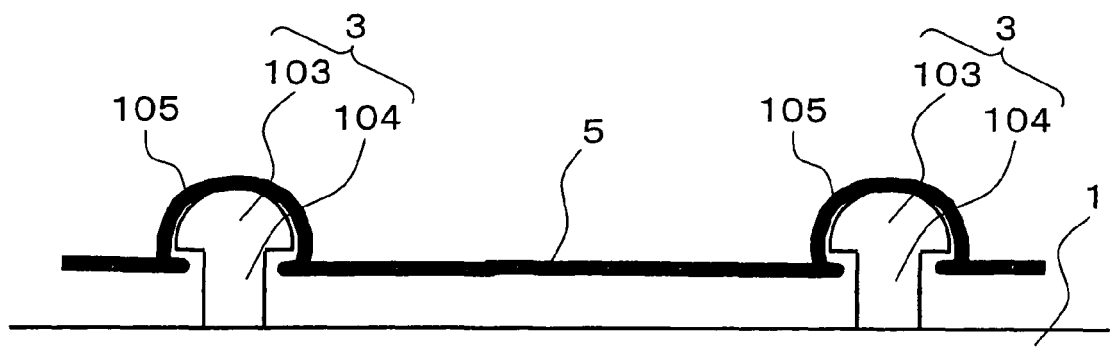
FIG. 19(a) is an explanatory diagram illustrating supporting columns of the microswitch shown in FIGS. 1(a) and 1(b), where each supporting column has a column capital portion having a semispherical shape.
FIG. 19(b) is an explanatory diagram, where the column capital portion has a triangular shape.
Figure 19:
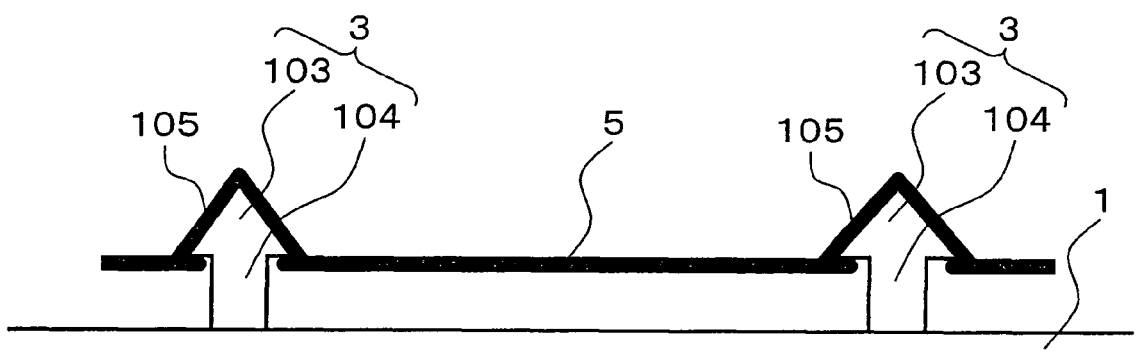

For example, as shown in FIG. 19(*a*), the column capital portion 103 of each supporting column 3 may have a hemispherical.

The shape of the column capital portion 103 is not limited to the spherical shape. For example, as shown in FIG. 19(*b*), the column capital portion 103 of each supporting column 3 may have a triangular shape (triangular pyramid shape). In this case, it is preferable that the inner surface of the cap dome 105 has the same shape as the column capital portion 103, that is, the triangular shape (triangular pyramid shape).

As described with reference to FIGS. 4 to 12, in the manufacturing process for the present switch, the rocking plate 5 is formed in a self-aligning manner in accordance with the shape of the column capital portion 103.

In the present embodiment, only one of the two pairs of signal line electrodes 8*a*, 8*b* and 9*a*, 9*b* (the pairs are provided in the two directions, respectively) are enabled to transmit a signal. However, the present switch may be arranged so that the two pairs of signal line electrodes 8*a*, 8*b* and 9*a*, 9*b* (the pairs are provided in the two directions, respectively) are simultaneously enabled to transmit signals.

Figure 2:
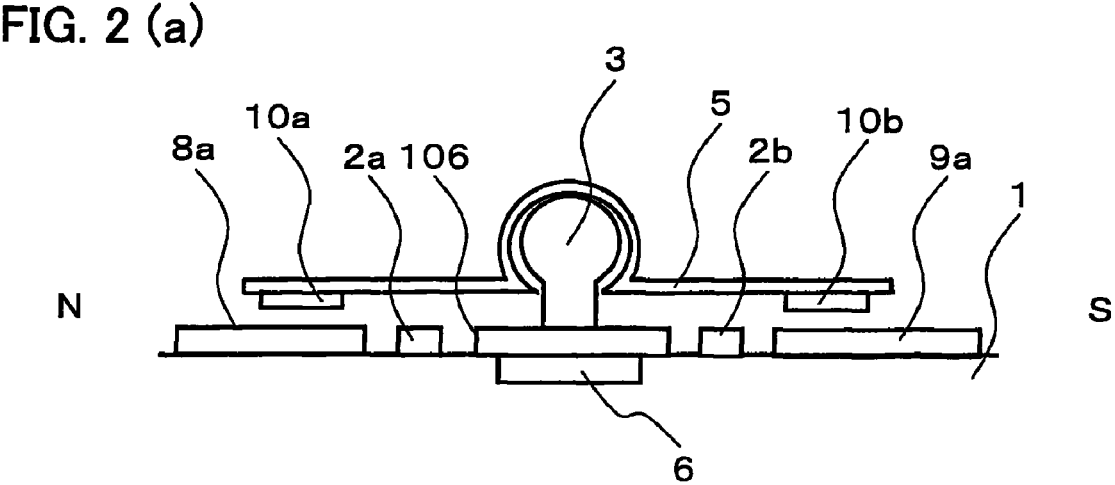
FIG. 2(a) is an explanatory diagram illustrating a state of equilibrium of a rocking plate of the microswitch shown in FIG. 1(a).
FIGS. 2(b) and 2(c) are explanatory diagrams illustrating states of the rocking plate tilted toward a substrate.
Figure 2:
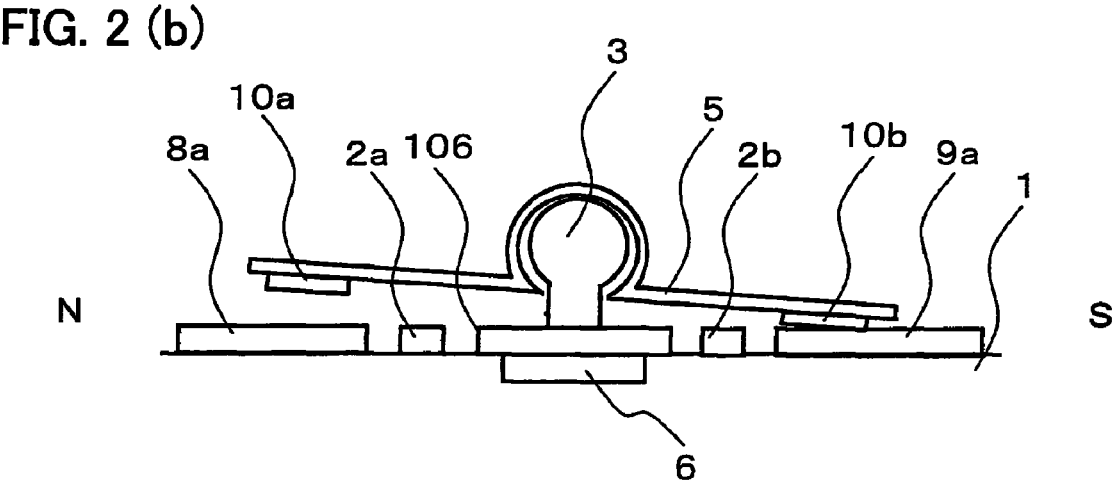
Figure 2:
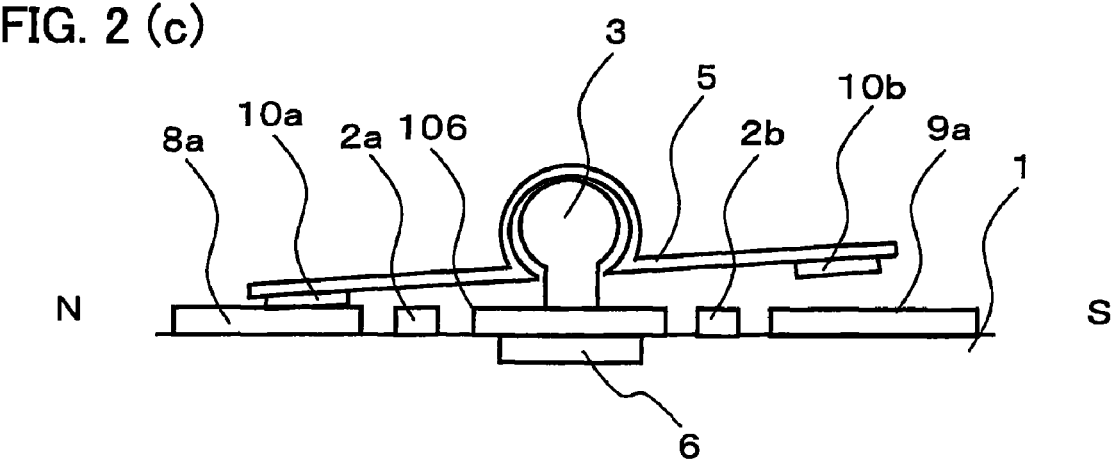
Figure 3:
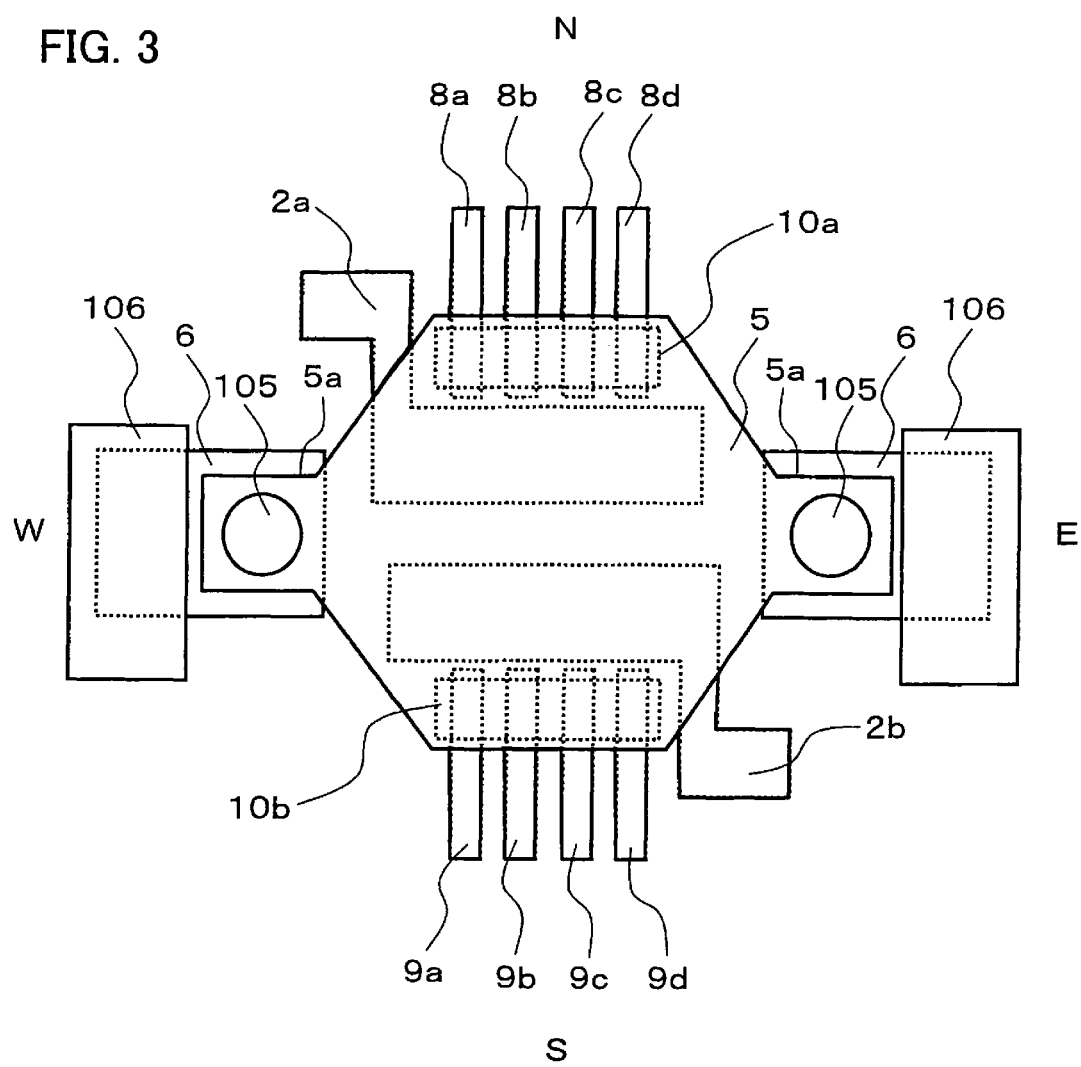
FIG. 3 is an overhead view illustrating a microswitch in which four signal line electrodes are provided in an N-direction and four signal line electrodes are provided in an S-direction.
Figure 20:
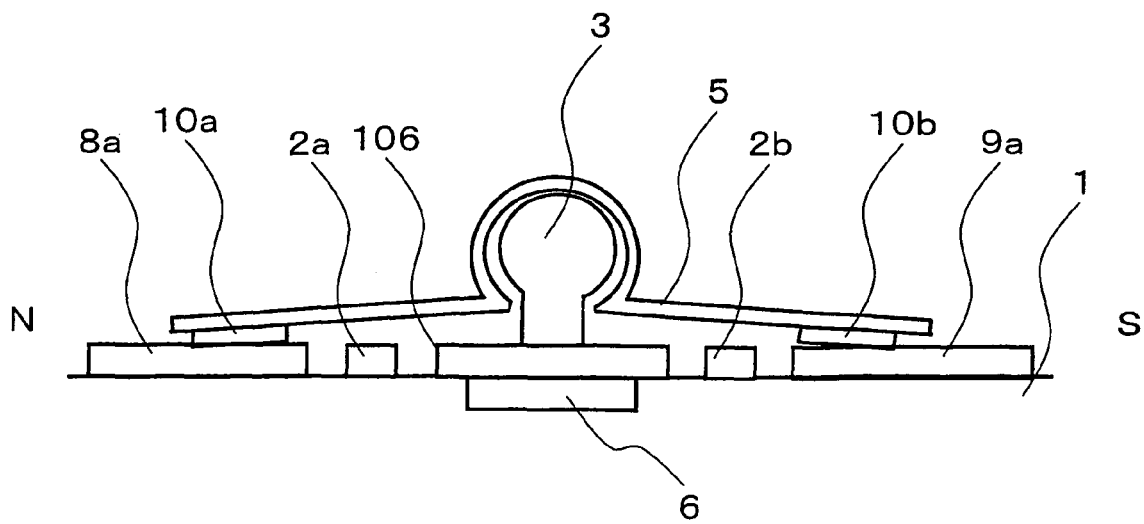
FIG. 20 is an explanatory diagram illustrating the microswitch shown in FIGS. 1(a) and 1(b) in which contact points are connected at two positions.

FIG. 20 is an explanatory diagram illustrating the present switch (seen from the E-direction in FIG. 1(*a*)) that is in a state where charge is applied both to the adsorption electrodes 2*a* and 2*b*, so that the contact electrodes 10*a* and 10*b*, which are respectively provided in the two directions, contact the corresponding pairs of signal line electrodes 8*a*, 8*b* and 9*a*, 9*b* (a switching state where two contact points are connected).

Thus, by using the present switch, many contact points can be connected by the single switch. As a result, it is possible to use chip area more efficiently.

Figure 21:
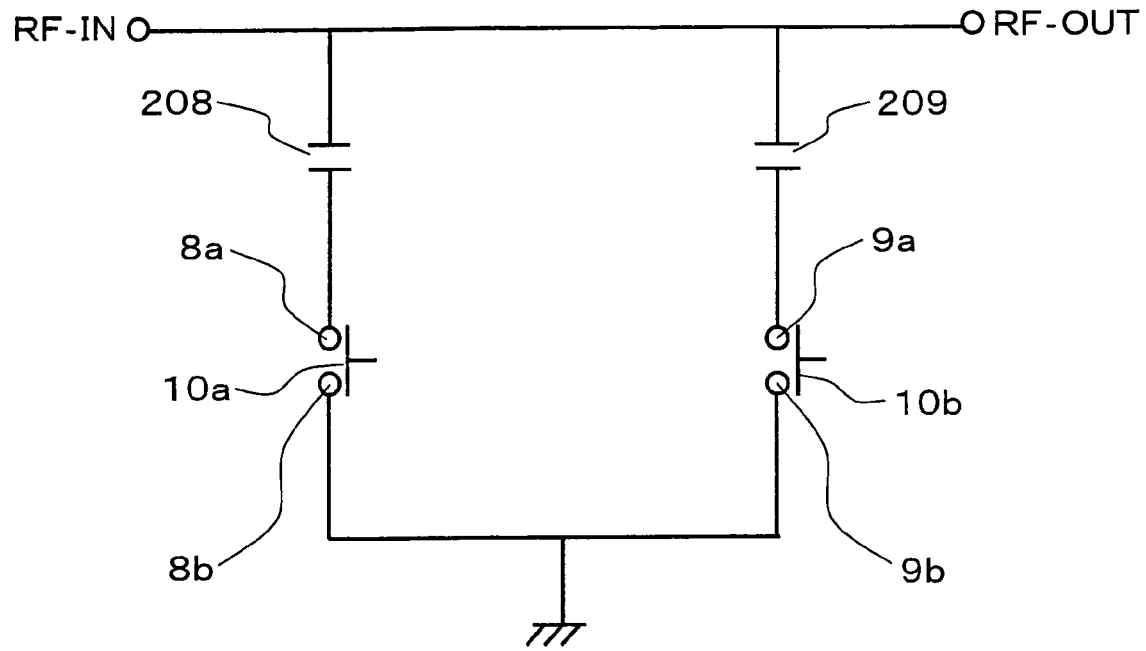
FIG. 21 is an equivalent circuit diagram illustrating an example of an RF circuit using the microswitch shown in FIGS. 1(a) and 1(b).

FIG. 21 is an equivalent circuit diagram illustrating an example of an RF circuit using the present switch shown in FIGS. 1(*a*) and 1(*b*).

In this circuit, capacitance values are adjusted by connecting a plurality of capacitors in parallel.

In this circuit, two capacitors 208 and 209 are connected in parallel on an electric transmission line (from RE-IN to RE-OUT).

In addition, the two pairs of signal line electrodes 8*a*, 8*b* and 9*a*, 9*b* of the present switch (the pairs are provided in the two directions, respectively) are provided between the capacitances 208, 209 and a ground line.

The capacitance value of the circuit can be switched by choosing which pair(s) of the signal line electrodes 8*a*, 8*b* and 9*a*, 9*b* is to be electrically connected at the same time. By doing so, characteristics of the RF circuit can be changed.

Not only the capacitors, but also inductors, resistors, filters, and the like may be provided in the circuit, and the present switch may be used to change connection states of these members. In this way, it is possible to adjust a circuit constant, thereby attaining a desired characteristic.

By using the present switch in such a circuit, plural kinds of circuit constants can be set by the single switch. Therefore, an electronic device including the circuit can be miniaturized.

In the present embodiment, the substrate 1 is a semiconductor substrate made of silicon. However, the substrate 1 may be an anti-insulating substrate (e.g. a GaAs substrate or a glass substrate), a ceramic substrate, an InP substrate, a GaN substrate, an SiC substrate, or the like.

Figure 22:
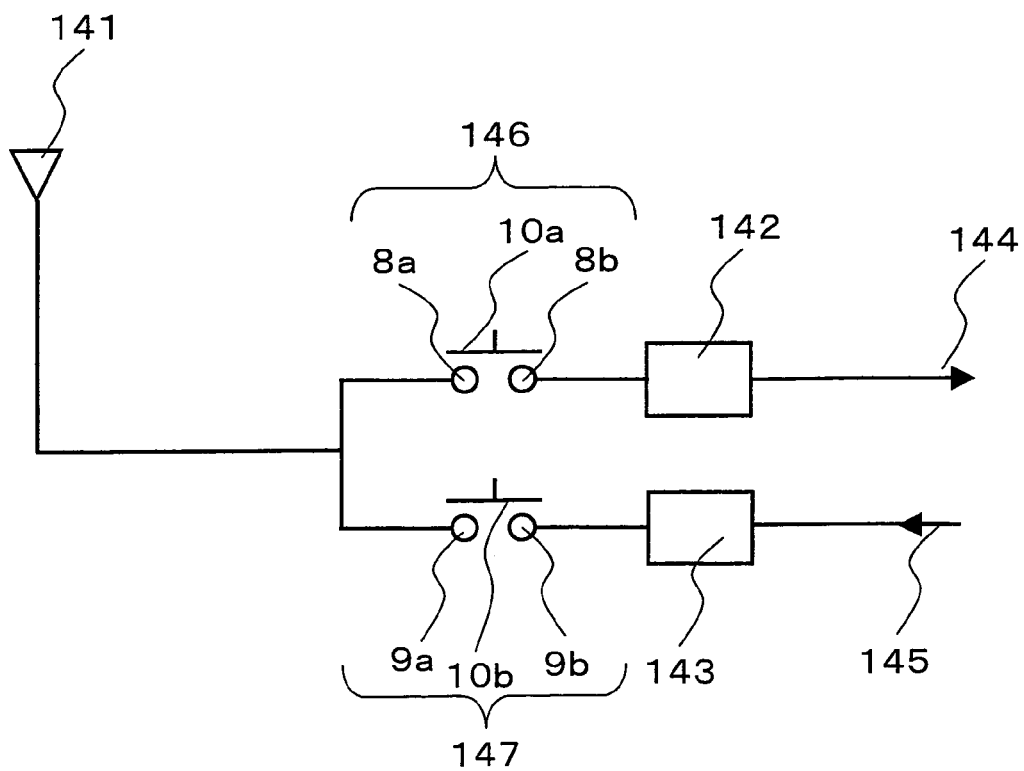
FIG. 22 is an equivalent circuit diagram illustrating another example of the RF circuit using the microswitch shown in FIGS. 1(a) and 1(b).

FIG. 22 is an equivalent circuit diagram illustrating another example of the RF circuit using the present switch shown in FIGS. 1(*a*) and 1(*b*).

In this circuit, the present switch is used in order to switch a transmitting circuit and a receiving circuit of a wireless communication circuit. Specifically, in this circuit, a receiving signal line electrode 144 and a transmitting signal line electrode 145 are switched by switches 146 and 147 connected to an antenna 141.

In this circuit, the transmitting signal line electrode 145, which is connected to the transmitting circuit (not shown) of the wireless communication circuit, is connected to the switch 147 through a filter 143. The receiving signal line electrode 144, which is connected to the receiving circuit (not shown) of the wireless communication circuit, is connected to the switch 146 through a filter 142.

In performing transmission, the switch 147 is turned ON, so as to connect the transmitting signal line electrode 145 of the wireless receiving circuit with the antenna 141. Then, a signal is transmitted from the antenna 141.

On the other hand, in performing receiving, the witch 146 is turned ON, so as to connect the receiving signal line electrode 144 with the antenna 141. Then, a signal received by the antenna 141 is introduced into the receiving circuit through the receiving signal line electrode 144.

In the example shown in FIG. 22, the present switch is used in order to switch the circuits to be connected with the antenna 141. However, the circuit shown in FIG. 22 and the circuit shown in FIG. 21 (the circuit in which the capacitance value is switched) may be mixed in one circuit, so as to switch transmission and reception while adjusting the capacitance value.

The circuit shown in FIG. 22 may further include a power amplifier for radio frequency waves, which is to be used both at the time of transmission and reception. In this case, the circuit (the transmission circuit or the receiving circuit) to be connected to the power amplifier for radio frequency waves is switched by the switch between transmission and reception.

Thus, by using the present switch, plural kinds of switching can be performed by the single switch. Therefore, as compared to the arrangement of using a semiconductor switch, circuit area can be smaller (circuit area can be used more efficiently). In addition, high-isolation and low-loss switching can be performed. Therefore, it is possible to attain low power consumption.

In the present switch, the contact electrodes 10*a* and 10*b*, which are provided on the rocking plate 5 that faces the signal line electrodes 8*a*, 8*b* and 9*a*, 9*b*, contact the signal line electrodes 8*a*, 8*b* and 9*a*, 9*b*. On the other hand, the contact electrodes 10*a* and 10*b* do not contact the adsorption electrodes 2*a* and 2*b*. The present switch attracts the rocking plate 5 (the contact electrodes 10*a* and 10*b*) toward the substrate 1 by means of the electrostatic force generated between the adsorption electrodes 2*a*, 2*b* and the rocking plate 5. If the rocking plate 5 contacts the adsorption electrodes 2*a*, 2*b*, the electrostatic force disappears.

If the present switch is an RF switch, the contact electrodes 10*a* and 10*b* can be connected to the signal line electrodes 8*a*, 8*b* and 9*a*, 9*b*, even if capacitors are provided therebetween.

In this case, accuracy of the gap between the contact electrodes 10a, 10b and the signal line electrodes 8a, 8b and 9a, 9b is important, because the accuracy of the gap (or the thickness of the dielectric film) determines the capacitance value. It is preferable that the capacitance value is a value suitable for a switching characteristic at a desired frequency. Therefore, the capacitance value varies according to the frequency. In connecting metal with metal (DC-DC connection), there are problems of abrasion and fixation at contact points. These problems do not occur if the dielectric material is sandwiched therebetween. This enhances reliability.

In the present embodiment, the insulating films 11 and 12 are photoresist films. However, the insulating films 11 and 12 may be (i) inorganic insulating films such as silicon nitride films or oxynitriding silicon films, (ii) silicon oxide films in which phosphorus, boron or the like is dispersed, or (iii) organic insulating films made of photoresist, polyimide, fluoric resin, or the like.

If a semiconductor element is formed on a semiconductor substrate, and the present switch is formed thereon so as to integrate (laminate) the semiconductor element and the switch, it is preferable to manufacture the present switch within a temperature range that does not change the characteristic of the semiconductor element. Therefore, it is preferable to carry out manufacturing steps for the present switch within a temperature range of not higher than about 300° C.

If the supporting columns 3 and the rocking plate 5 are made of metal and formed by the plating, spattering, evaporation, and the like method, it is possible to perform the manufacturing steps for the present switch at a temperature within the foregoing range.

In the present embodiment, the diffusion layers 6 are formed by performing ion implantation on such positions of the substrate 1 where the supporting columns 3 are to be formed. However, instead of the diffusion layers 6, low-resistance metal wires may be provided on such positions where the supporting columns 3 is to be formed, with an end of each metal wire being grounded.

It is preferable that the present switch is in one of the following states 1 to 3 while idling (waiting), that is, while power is supplied but no switching is required.

State 1: The contact electrode 10a provided on the rocking plate 5 is caused to contact (fixed to) the signal line electrodes 8a and 8b by the adsorption electrode 2a.

State 2: The contact electrode 10b provided on the rocking plate 5 is caused to contact the signal line electrodes 9a and 9b by the adsorption electrode 2b.

State 3: The rocking plate 5 is kept in equilibrium (neither the contact electrode 10a nor 10b is in contact with the signal line electrodes 8a, 8b or 9a, 9b) by the adsorption electrodes 2a and 2b.

In the present embodiment, the rocking plate 5 is provided with the contact electrodes 10a and 10b. However, the contact electrodes 10a and 10b may not be provided as long as the adsorption electrodes 2a and 2b can attract the rocking plate 5, and the rocking plate 5 can electrically connect the signal line electrodes 8a and 8b or the signal line electrodes 9a and 9b.

In the present switch, the supporting columns 3 made of metal may be respectively formed on the two drawing electrodes (metal wires) 106, which are formed on the surface of the substrate 1. The rocking plate 5 may be made of metal obtained by nitriding high-melting-point metal such as tungsten.

In the present embodiment, the diffusion layers 6 are respectively grounded through the drawing electrodes 106. However, the diffusion layers 6 may not be grounded through the drawing electrodes 106, as long as the potentials of at the diffusion layers 6 can be fixed.

In the present embodiment, the column capital portion 103 and the leg portion 104 of each supporting column 3 are made of polycrystalline silicon. However, the column capital portion 103 and the leg portion 104 of each supporting column 3 may be made of such conductive material as metal.

In the present embodiment, the two supporting columns 3 are provided on the substrate 1, and the two cap domes 105 are provided on the rocking plate 5.

However, the number of the supporting columns 3 provided in the present switch (and an optical switch, described later) may be more than two.

In this case, it is preferable to arrange more than two supporting columns 3 in a line, on the substrate 1.

In the present embodiment, the present switch is a switch for switching conduction states of the signal line electrodes 8a, 8b and 9a, 9b by rocking the rocking plate 5.

However, the present switch may be used as an optical switch (optical path switch; electrostatic-actuator-type optical switch) for controlling (changing) an optical path of light (e.g. a laser beam) by rocking the rocking plate 5.

FIG. 23(a) is an overhead view illustrating an arrangement of the present switch designed as an optical switch (present optical switch). FIG. 23(b) is a cross-sectional view taken along line A-A in FIG. 23(a). FIG. 23(c) is a cross-sectional view taken along line B-B in FIG. 23(a).

As shown in FIGS. 23(a) to 23(c), the present switch has an arrangement similar to that of FIG. 1. However, the signal line electrodes 8a, 8b, the signal line electrodes 9a, 9b, and the contact electrodes 10a, 10b are not provided, and a light-reflecting layer 212 is provided on the rocking plate 5.

In the present optical switch, the adsorption electrodes 2a and 2b are respectively provided farther from the center of the rocking plate 5 toward the N-direction and S-direction than those of FIG. 1.

On the surface of the rocking plate 5, the light-reflecting layer (light reflector) 212 is provided. The light-reflecting layer 212 is made of metal such as aluminum or nickel, and reflects light.

The present optical switch includes supporting-column-use electrodes 211, instead of the diffusion layers 6 and the drawing electrodes 106. On the supporting-column-use electrodes 211, the supporting columns 3 made of metal are provided, respectively. The supporting-column-use electrodes 211 are electrode wires for fixing the potentials of the supporting columns 3.

Figure 23:
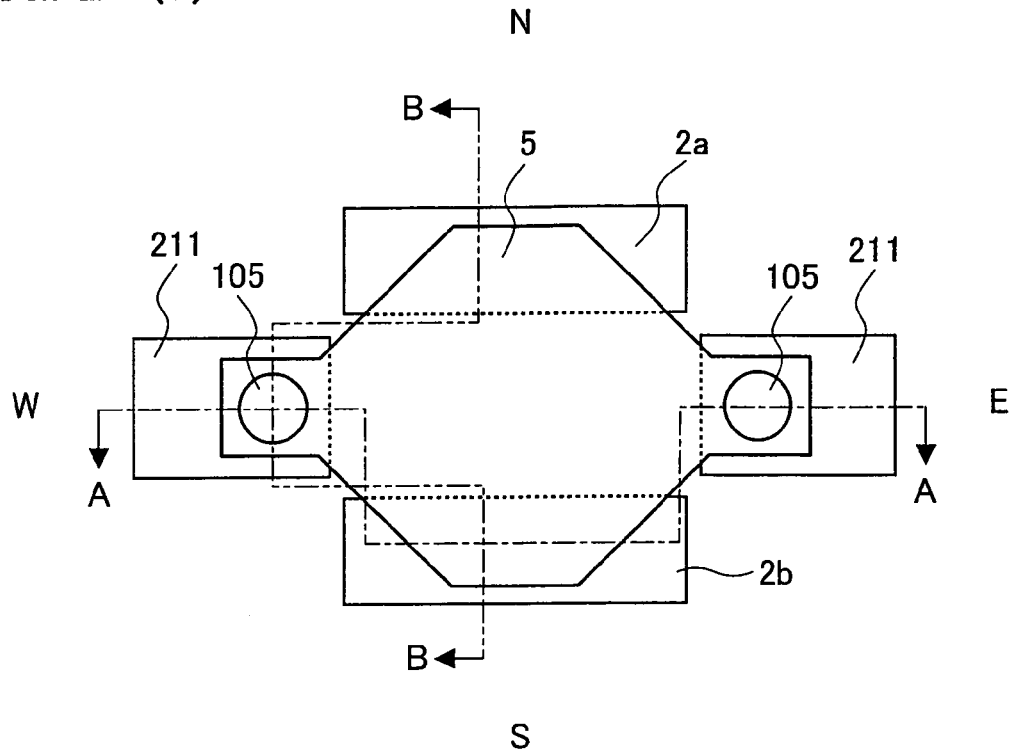
FIG. 23(a) is an overhead view illustrating an arrangement of an optical switch in accordance with one embodiment of the present invention.
FIG. 23(b) is a cross-sectional view taken along line A-A in FIG. 23(a).
FIG. 23(c) is a cross-sectional view taken along line B-B in FIG. 23(a).
Figure 23:
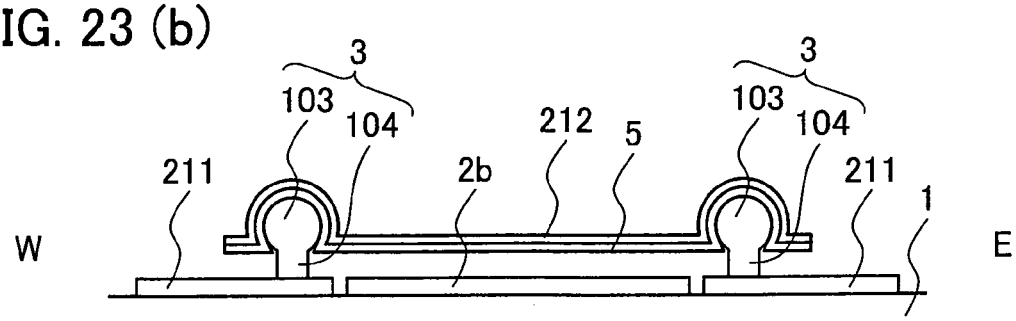
Figure 23:
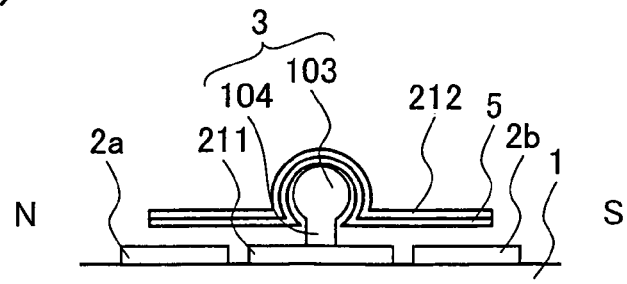
Figure 24:
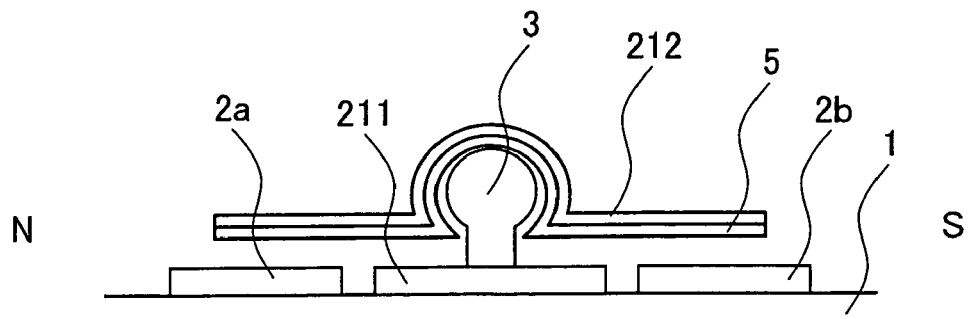
FIGS. 24(a) to 24(c) are explanatory diagrams illustrating operating states of the optical switch shown in FIGS. 23(a) to 23(c).
Figure 24:
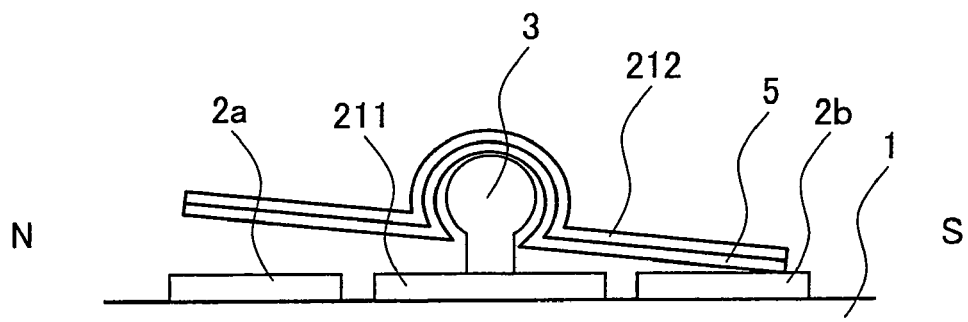
Figure 24:
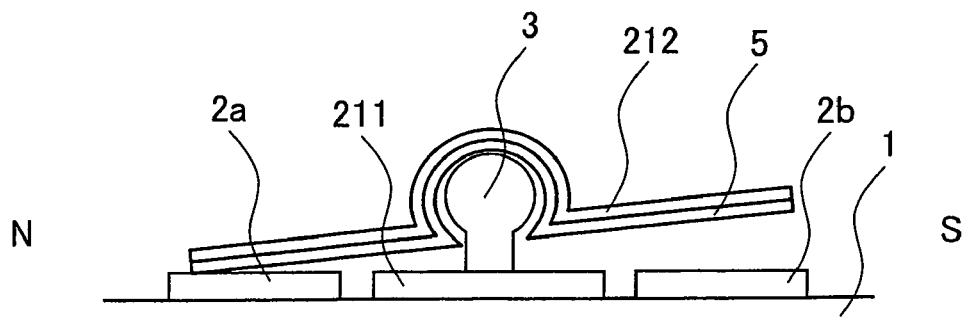

FIGS. 24(a) to 24(c) are explanatory diagrams illustrating operating states of the present optical switch. FIG. 24(a) is a cross-sectional view taken along line B-B of FIG. 23(a), where no charge is applied to the adsorption electrodes 2a and 2b. In this case, the rocking plate 5 is kept in equilibrium (not tilted in any direction) on the supporting columns 3, as long as the substrate 1 is horizontal.

Such a state of equilibrium of the rocking plate 5 can be attained also by respectively applying equivalent charges (electrostatic forces) to the two adsorption electrodes 2a and 2b, which are line-symmetrical to one another with respect to a line connecting the two supporting columns 3.

FIG. 24(b) is a cross-sectional view taken along line B-B (FIG. 23(a)), where the voltage applied to the adsorption electrode 2b, which is provided in the S-direction, is increased by the control circuit, so as to apply charge thereto. In this case, as shown in FIG. 24(b), the rocking plate 5 is tilted in the S-direction, due to the electrostatic attracting force (adsorption force) generated between the rocking plate 5 and the adsorption electrode 2b.

FIG. 24(c) is a cross-sectional view taken along line B-B (FIG. 23(a)), where the voltage applied to the adsorption electrode 2a, which is provided in the N-direction, is increased by the control circuit, so as to apply charge thereto. In this case, as shown in FIG. 24(c), the rocking plate 5 is tilted in the N-direction, due to the electrostatic attracting force (adsorption force) generated between the rocking plate 5 and the adsorption electrode 2a.

The following describes a method of manufacturing the present optical switch.

First, on the substrate 1, which is a semiconductor made of silicon, a metal film (made of aluminum, nickel, titanium, tungsten, or gold, for example) is formed by a spattering device, an evaporation device, or the like used in an ordinary semiconductor process. The metal film is to be the adsorption electrodes 2a and 2b, and the supporting-column-use electrodes 211.

On the metal film, a resist mask pattern is formed by the photolithography method of a semiconductor process. Then, using the pattern as a mask, etching is performed so as to form the adsorption electrodes 2a and 2b, and the supporting-column-use electrodes 211 (these electrodes may be formed by the liftoff method).

Next, by the method shown in FIGS. 4 to 9, the supporting columns 3, which are made of metal such as gold or nickel, are respectively formed on the supporting-column-use electrodes 211.

Next, as in the method of FIG. 10, such resin as photoresist or polyimide, which is to be the sacrificial film 17, is applied to the entire surface by rotation paint (the electrodes 10a and 10b are not formed). Thereafter, as shown in FIG. 11, a metal film 18 (e.g. a tungsten nitride film), which is to be the rocking plate 5, is formed on the sacrificial film 17 by spattering or the like method.

Next, metal having high light-reflectivity, such as aluminum or nickel, is formed on the metal film 18 by spattering evaporation, or the like method.

Next, by the photolithography method, a resist mask is formed on the metal film 18 in accordance with the shape of the rocking plate 5, and the metal film 18 is etched by dry etching or the like method. Then, the resist mask and the sacrificial film 17 are removed.

As described above, the through hole 25 may be provided at a part of each cap dome 105 of the rocking plate 5 (a part where the rocking pate 5 is engaged with the column capital portion 103 of the supporting column 3) (see FIGS. 18(a) and 18(b)). With this arrangement, etchant can be injected through the through hole 25 in the step of removing the sacrificial film 17. Therefore, the sacrificial film 17 can be removed efficiently.

The following describes an example of application of the present optical switch.

Figure 25:
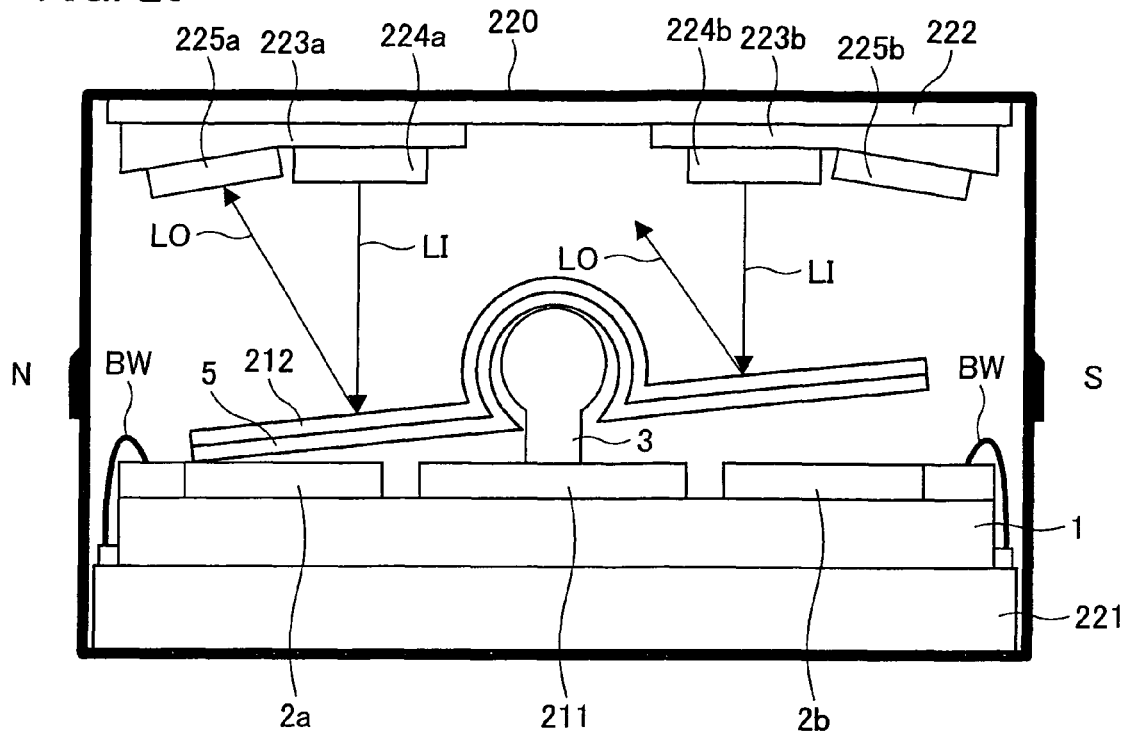
FIG. 25 is an explanatory diagram illustrating an optical switch system including the optical switch shown in FIGS. 23(a) to 23(c).

FIG. 25 is an explanatory diagram illustrating an optical switch system including the present optical switch (present system). As shown in FIG. 25, in the present system, the present optical switch is attached to an installation substrate 221 and contained in a case 220.

As shown in FIG. 25, the present optical switch is mounted on the installation substrate 221. The adsorption electrodes 2a and 2b (and the supporting-column-use electrodes 211) of the present optical switch are connected to the installation substrate 221 through bonding wires BW.

In the present system, the case 220 also contains an optical system substrate (installation substrate) 222 provided in such a portion as to face the present optical switch (the installation substrate 221).

On the optical system substrate 222, two module substrates (installation substrates) 223a and 223b are provided.

The module substrate 223a is provided on the N-side of the optical system substrate 222, and has a light-emitting element 224a and a light-receiving element 225a. The module substrate 223b is provided on the S-side of the optical system substrate 222, and has a light-emitting element 224b and a light-receiving element 225b.

The light-emitting elements (light sources) 224a and 224b are light sources such as light-emitting diodes or laser diodes. The light-emitting elements 224a and 224b emit light in accordance with electric signals (e.g. voltage signals) received from outside.

The light-receiving elements (light receivers) 225a and 225b are photodetectors (light detectors) such as photodiodes. The light-receiving elements 225a and 225b are photoelectric conversion elements for generating electric signals (e.g. voltage signals) in accordance with the light received.

In the present system is designed as follows. When the rocking plate 5 tilts in the S-direction and contacts the adsorption electrode 2b, the light emitted from the light-emitting element 224b is reflected by the light-reflecting layer 212 and reaches the light-receiving element 225b.

On the other hand, when the rocking plate 5 tilts in the N-direction and contacts the adsorption electrode 2a, the light emitted from the light-emitting element 224a is reflected by the light-reflecting layer 212 and reaches the light-receiving element 225a.

Figure 27:
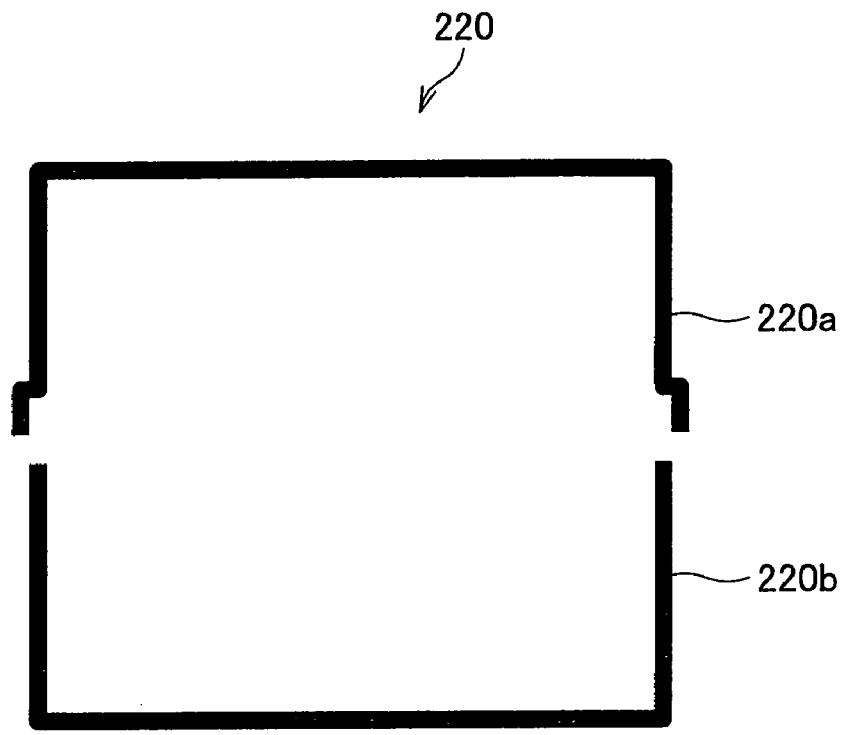
FIGS. 27(a) and 27(b) are explanatory diagrams illustrating an arrangement of a case of the optical switch system shown in FIG. 25.
Figure 27:
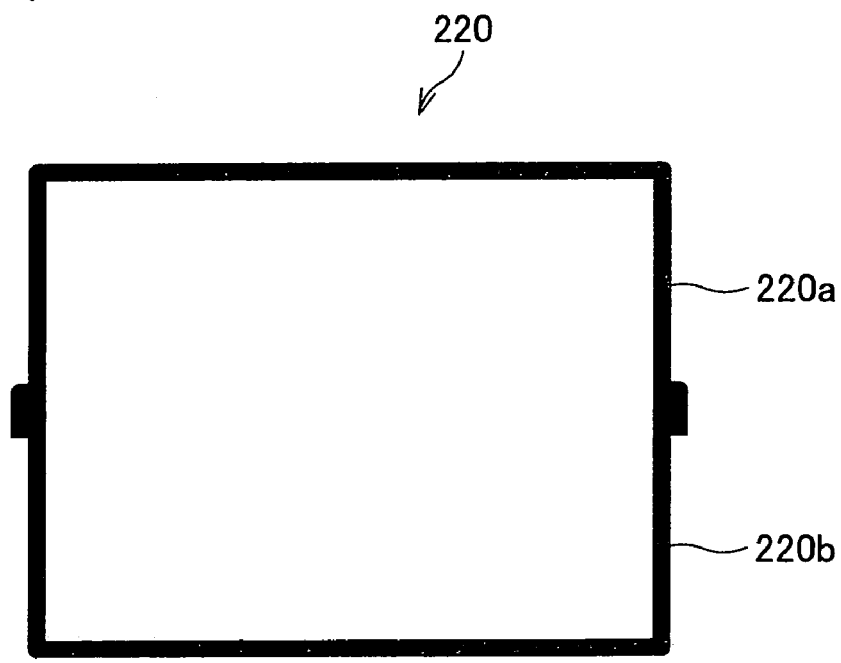

FIGS. 27(a) and 27(b) are explanatory diagrams illustrating an arrangement of the case 220.

As shown in FIG. 27(a), the case 220 is consisted of a first case 220a and a second case 220b. The first case 220a contains the optical system substrate 222, and the second case 220b contains the installation substrate 221.

In the present system, as shown in FIG. 27(b), the cases 220a and 220b are fitted together and sealed after all the members are installed.

Next, operating states of the present system are described. In the present system, incident light LI emitted from the light-emitting elements 224a and 224b are reflected on the light-reflecting layer 212, so as to generate two beams of reflected light LO.

By tilting the rocking plate 5 in the N-direction or S-direction, one beam of reflected light LO is selectively received by the light-receiving element 225a or 225b (the light-receiving element 225a or 225b that receives the reflected light LO is switched).

That is, if the light of the light-emitting element 224a is to be received by the light-receiving element 225a provided on the N-side, the control circuit increases the voltage applied to the adsorption electrode 2a provided in the N-direction, so as to apply charge thereto. Then, as shown in FIG. 25, the rocking plate 5 tilts in the N-direction due to the electrostatic attracting force (adsorption force) generated between the rocking plate 5 and the adsorption electrode 2a, and contacts the adsorption electrode 2a (at this time, the rocking plate 5 is grounded through the supporting columns 3 and the supporting-column-use electrodes 211).

In this state, when a voltage is applied to the light-emitting element 224a, the incident light LI from the light-emitting element 224a is emitted onto the light-reflecting layer 212 provided on the rocking plate 5, and the reflected light LO reaches the light-receiving element 225a.

In this state, as shown in FIG. 25, the light from the light-emitting element 224b does not reach the light-receiving element 225b.

Figure 26:
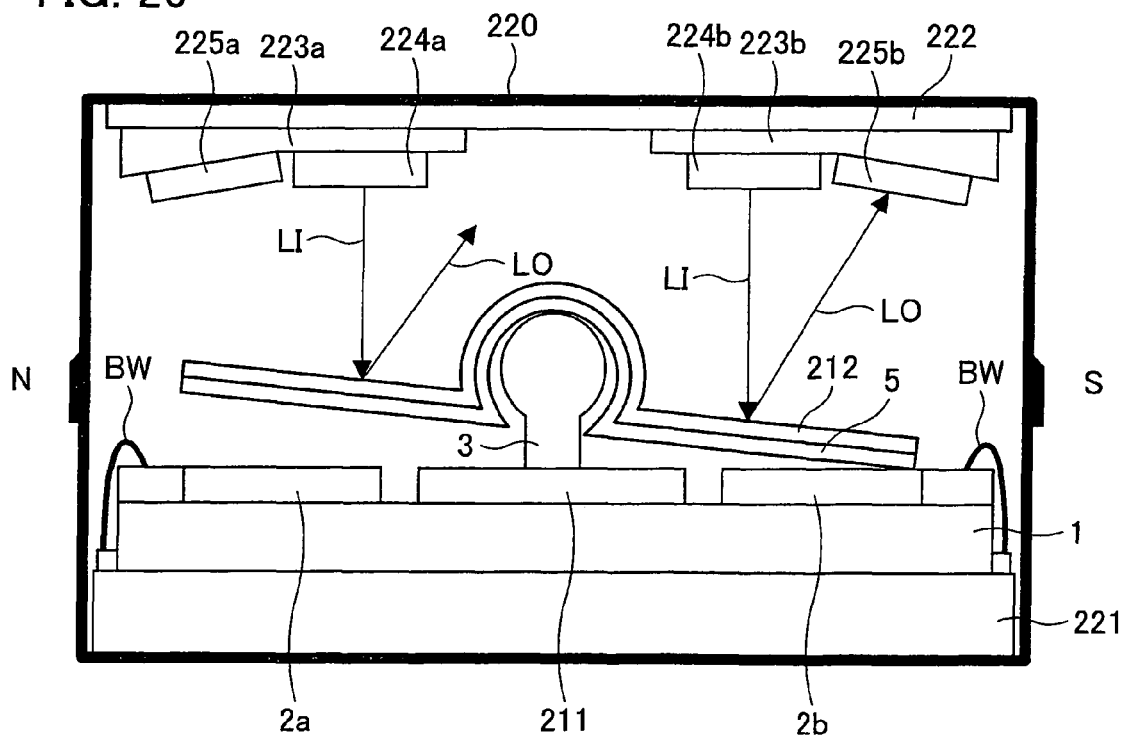
FIG. 26 is an explanatory diagram illustrating operation of the optical switch system shown in FIG. 25.

On the other hand, if the light of the light-emitting element 224b is to be received by the light-receiving element 225b provided on the S-side, the control circuit increases the voltage applied to the adsorption electrode 2b provided in the S-direction, so as to apply charge thereto. Then, as shown in FIG. 26, the rocking plate 5 tilts in the S-direction due to the electrostatic attracting force (adsorption force) generated between the rocking plate 5 and the adsorption electrode 2b, and contacts the adsorption electrode 2b (at this time, the rocking plate 5 is grounded through the supporting columns 3 and the supporting-column-use electrodes 211).

In this state, when a voltage is applied to the light-emitting element 224b, the incident light LI from the light-emitting element 224b is emitted onto the light-reflecting layer 212 provided on the rocking plate 5, and the reflected light LO reaches the light-receiving element 225b. In this state, as shown in FIG. 26, the light from the light-emitting element 224a does not reach the light-receiving element 225a.

Thus, with the present system, the light-receiving element 225a or 225b that receives the reflected light LO can be switched by switching the direction of tilt of the rocking plate 5. Therefore, a plurality of switching states (which of the light-receiving elements 225a and 225b receives the reflected light LQ) can be controlled by the present optical switch alone.

It is preferable that the inner wall of the cases 220a and 220b (see FIGS. 27(a) and 27(b)) is painted black or coated with black resin or the like, so that the inner wall does not reflect light (so that the inner wall absorbs light). Alternatively, the cases 220a and 220b may be made of antireflection material.

With this arrangement, even if the reflected light LO from the light-reflecting layer 212 reaches the inner wall of the case 220a or 220b, the reflected light LO will not be reflected again (diffused reflection will not occur). Therefore, it is possible to prevent the light-receiving elements 225a and 225b from receiving the reflected light LO. As a result, malfunctioning of the present system can be reduced.

In the present system, it is preferable that the module substrates 225a and 225b have sloped portions corresponding to the tilt of the rocking plate 5, and that the light-receiving elements 225a and 225b are provided on the sloped portions.

For example, it is preferable that the light-reflecting layer 212 and the light-receiving element 225b become parallel when the rocking plate 5 tilts in the S-direction, and that the light-reflecting layer 212 and the light-receiving element 225a become parallel when the rocking plate 5 tilts in the N-direction.

With this arrangement, efficiency of incidence of the reflected light LO onto the light-receiving elements 225a and 225b can be improved.

Figure 28:
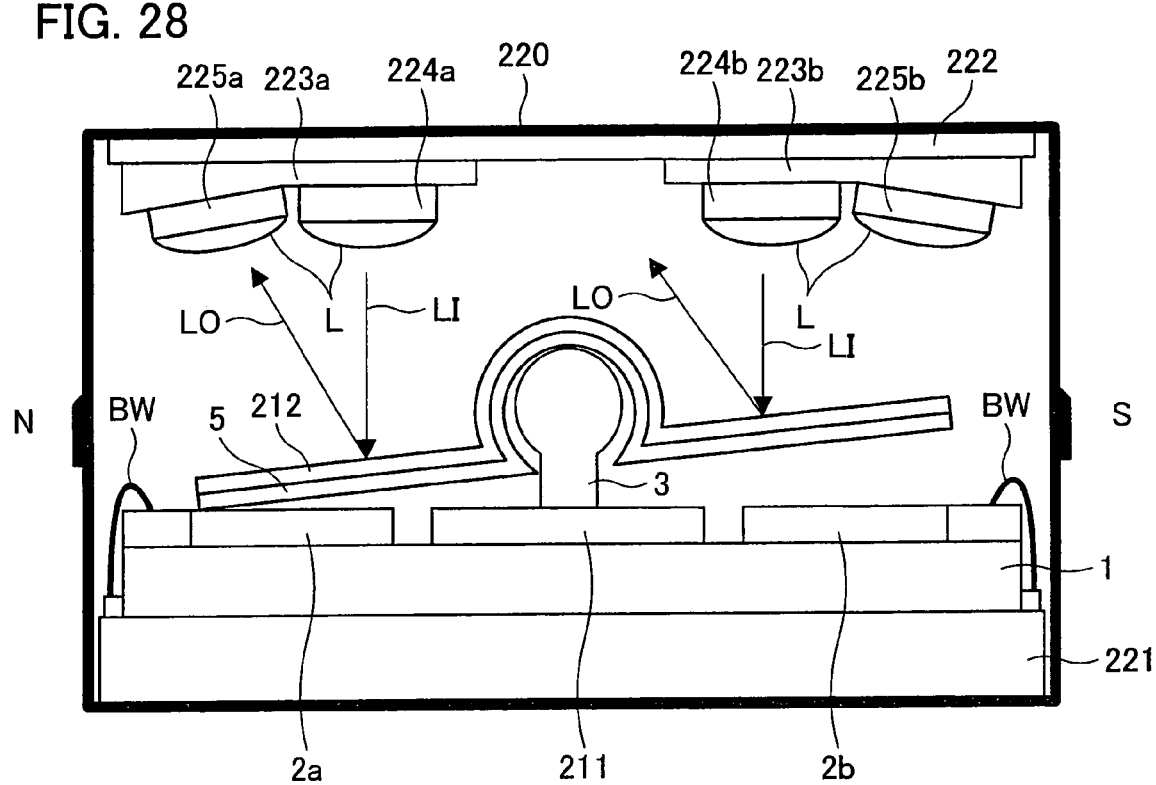
FIG. 28 is an explanatory diagram illustrating the optical switch system of FIG. 25 provided with lenses.

As shown in FIG. 28, a lens having a function of condensing light (light-condensing lens) L may be provided on the surface of the light-emitting elements 224a and 224b of the present system. With this arrangement, the optical path (emitted light path) of the incident light LI can be narrowed. Therefore, the incident light LI can be emitted onto the light-reflecting layer 212 certainly (efficiently).

By providing the lens L also on the surface of the light-receiving elements 225a and 225b, the reflected light LO from the light-reflecting layer 212 can be condensed efficiently onto the light-receiving elements 225a and 225b.

By thus providing the lens on the surface of the light-emitting elements 224a and 224b and the light-receiving elements 225a and 225b, it is possible to increase the amount of reflected light LO received by the light-receiving elements 225a and 225b. Therefore, it is possible to improve the accuracy of switching (accuracy of optical switching operation) of the present system.

In the arrangement of FIG. 25, the adsorption electrodes 2a, 2b and the supporting-column-use electrodes 211 are connected to the installation substrate 221 through the bonding wires BW.

However, the present system may be arranged without using the bonding wires BW to connect the substrate 1 and the installation substrate 221.

Figure 29:
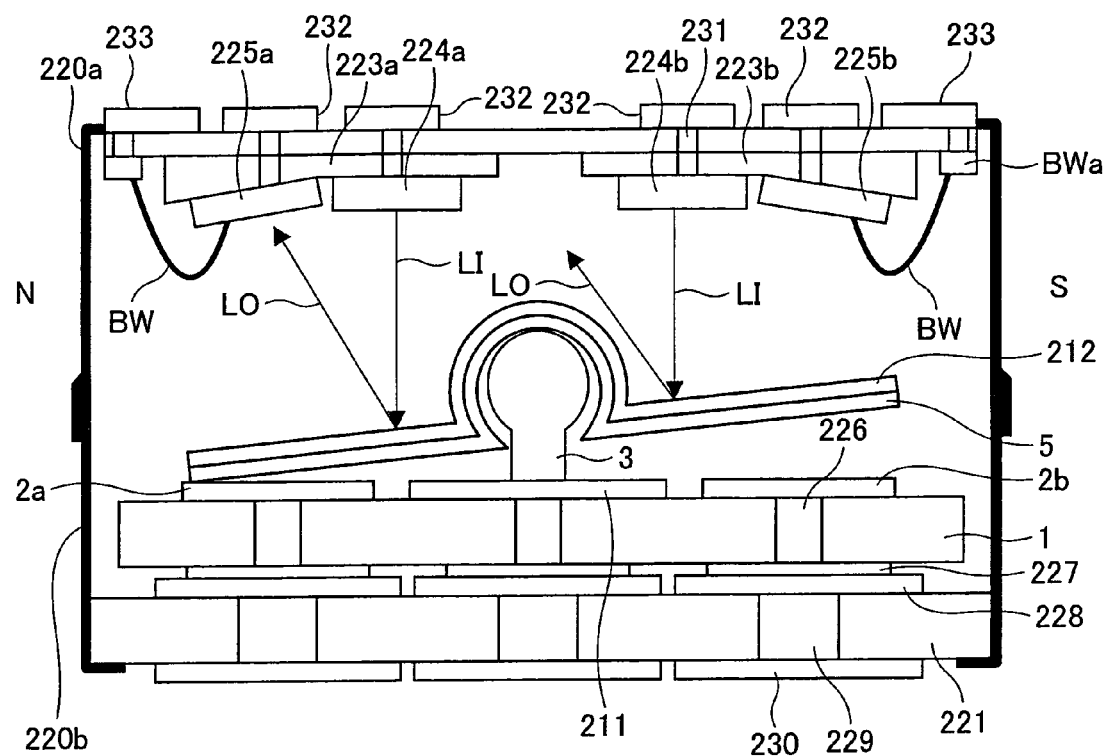
FIG. 29 is an explanatory diagram illustrating another optical switch system including the optical switch shown in FIGS. 23(a) to 23(c).

FIG. 29 is an explanatory diagram illustrating the present system arranged without using the bonding wires BW to connect the substrate 1 and the installation substrate 221. As shown in FIG. 29, in this arrangement, the substrate 1 of the present optical switch is provided with through wires 226 that run through the substrate 1 from the backside and reach the adsorption electrodes 2a, 2b and the supporting-column-use electrodes 211. On the backside of the substrate 1, backside electrodes 227 are provided. The backside electrodes 227 are respectively connected to the through wires 226.

On the front side of the installation substrate 221 (the side on which the present optical switch is installed), installation substrate electrodes 228 are provided at such positions as to respectively contact the backside electrodes 227 of the present optical switch. The installation substrate 221 is provided with installation substrate through wires 229 that run through the installation substrate 221 from the backside and reach the installation substrate electrodes 228.

Further, on the backside of the installation substrate 221, external electrodes (surface electrodes) 230 are provided. The external electrodes 230 are respectively connected to the installation substrate through wires 229.

In this arrangement, holes are provided on the bottom surface of the second case 220b of the case 220. Therefore, the external electrodes 230 can be exposed through the holes.

By thus using the through wires 226 and 229, instead of the bonding wires BW, to connect the substrate 1 and the electrodes 2a, 2b, and 211, wire paths in the case 220 can be shortened.

If the wire paths are shortened as described above, the possibility of breaking of the wires can be reduced, and electric noises become less likely to be received. Therefore, it is possible to improve the reliability of the present system.

As shown in FIG. 29, the optical system substrate 222 and the module substrates 223a and 223b may be provided with through wires 231 that run through the optical system substrate 222 and the module substrates 223a and 223b from the backside and reach the light-emitting elements 224a and 224b, the light-receiving elements 225a and 225b, and bonding wires BWa.

In this case, external electrodes (surface electrodes) 232 and 233 are provided on the backside of the optical system substrate 222 (the side on which the module substrates 223a and 223b are not provided). The external electrodes 232 and 233 are respectively connected to the through wires 231. The bonding wires BWa are connected to the light-emitting elements 224a, 224b and the light-receiving elements 225a, 225b, through the bonding wires BW.

Therefore, in this arrangement, each of the light-emitting elements 224a, 224b, and the light-receiving elements 225a, 225b is connected to (i) an external electrode 232 corresponding to a through wire 231 connected thereto and (ii) an external electrode 233 connected through a bonding wire BW.

The first case 220a of the case 220 is provided with holes. Therefore, the external electrodes 232 and 233 can be respectively exposed through the holes.

On the optical system substrate 222, it is preferable to use the through wires 231 as long as possible, instead of bonding wires, as described above.

With this arrangement, the wire paths in the case 220 can be shortened. Therefore, the possibility of breaking of the wires can be reduced, and electric noises become less likely to be received. This improves reliability of the present system.

The through wires 226 and 229 may be applied to the microswitch shown in FIGS. 1(a) and 1(b). That is, in the arrangement of FIGS. 1(a) and 1(b), the adsorption electrodes 2a and 2b may be electrically connected through the through wires 226 and 229.

According to the above, the light source of the present system is a light-emitting element (diode) for outputting light in accordance with an electric signal (e.g. voltage signal) received from outside. The light receiver of the present system is a light-receiving element (photoelectric conversion element) for outputting an electric signal in accordance with received light.

However, the light source of the present system may be an optical waveguide (waveguide for light; optical fiber or the like) for radiating an optical signal received from outside onto the light-reflecting layer of the present optical switch.

The light-receiving element of the present system may be an optical waveguide, like the foregoing one, for directly outputting the reflected light LO from the light-reflecting layer 212, to outside.

Figure 30:
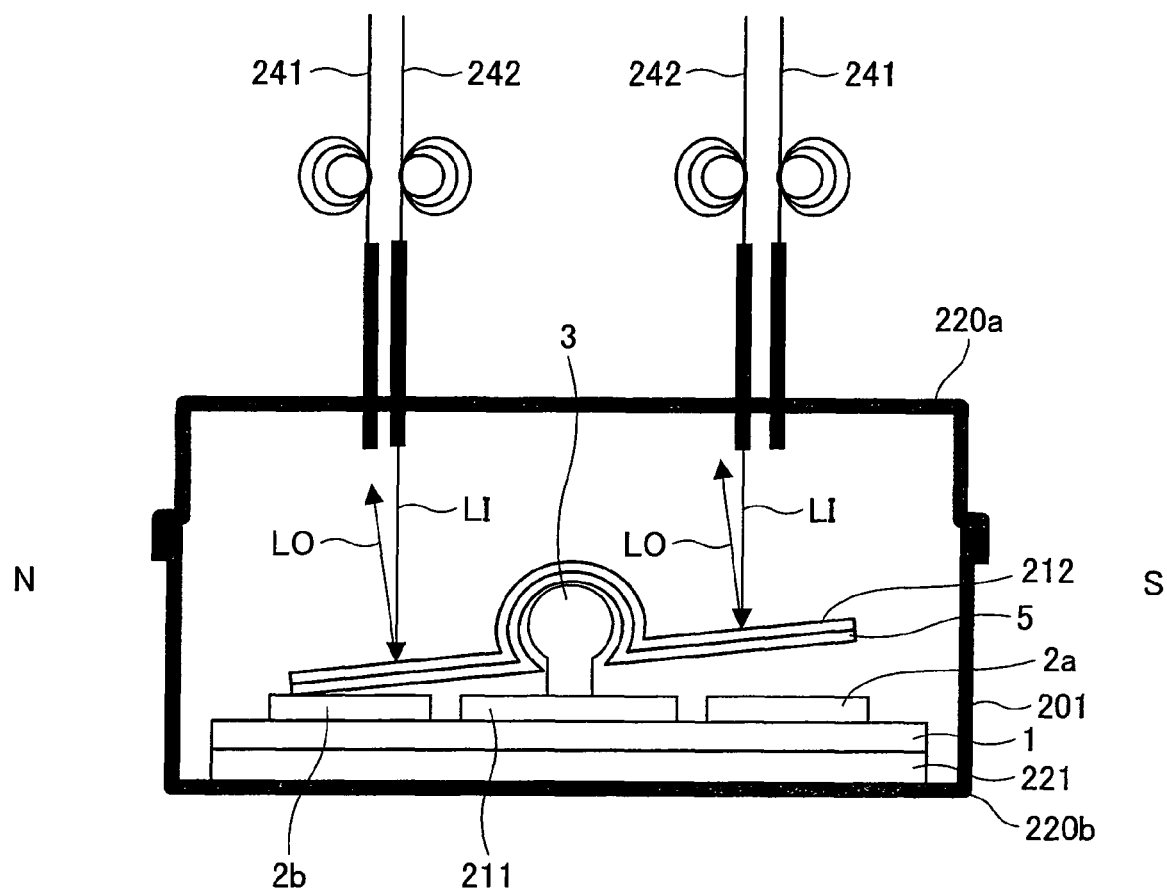
FIG. 30 is an explanatory diagram illustrating yet another optical switch system including the optical switch shown in FIGS. 23(a) to 23(c).
Figure 31:
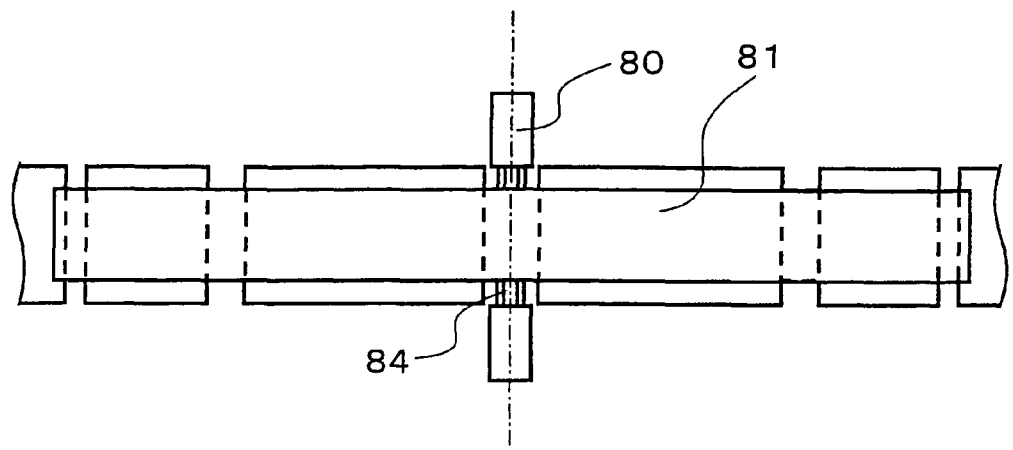
FIGS. 31(a) and 31(b) are explanatory diagrams illustrating a conventional microswitch.
Figure 31:
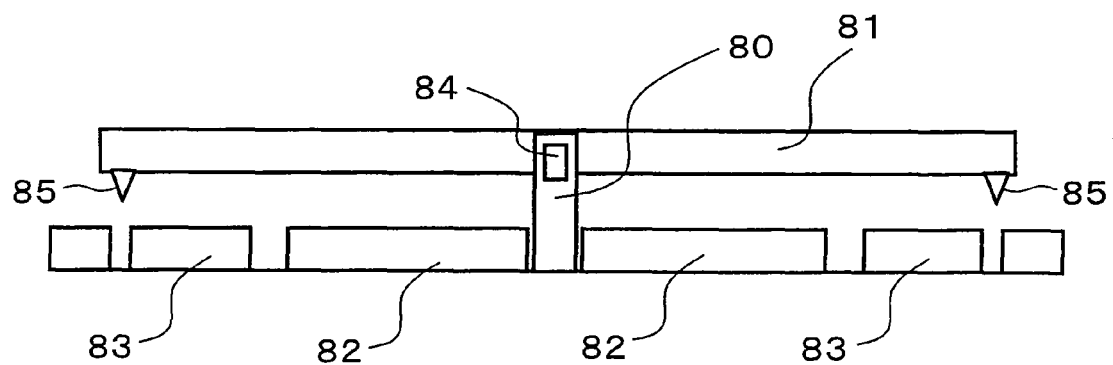

FIG. 30 illustrates a case where, in the arrangement of FIG. 25, instead of providing the optical system substrate 222 in the first case 220a, two pairs of optical fibers (each pair being a light-receiving optical fiber 241 and an incident-light-use optical fiber 242) are provided at such positions as to face the light-reflecting layer 212.

In this arrangement, the incident light LI from the incident-light-use optical fiber 242 is reflected on the light-reflecting layer 212. Then, the reflected light LO is received by the light-receiving optical fiber 241.

With this arrangement, an optical signal can be introduced into the present system from outside through the incident-light-use optical fiber 242, and the optical signal can be transmitted to outside through the light-receiving optical fiber 241. Since the optical signal can be transmitted and received directly, the present system can be used as a transponder (relay point) for optical communication.

In the arrangement of FIG. 30, the present system includes one present optical switch and two pairs of optical fibers. However, the present system may include a plurality of present optical switches, and each of the present optical switches may include two pairs of optical fibers. With this arrangement, the present system can be an optical switch system that can transmit and receive a plurality of optical signals.

By using the present system at a plurality of relay points for optical communication, it is possible to build a high-accuracy optical communication network. Like the present switches of FIGS. 1 to 22, the present optical switch can be manufactured by performing semiconductor processing on the single substrate 1.

The adsorption electrode control circuits (electrostatic force applying circuits; driving circuits (driving elements)), which are semiconductor elements for respectively controlling (driving) the adsorption electrodes 2a and 2b of the present optical switch, may also be formed on the substrate 1 of the present optical switch.

For example, as shown in FIGS. 15 and 16, the adsorption electrode control circuits (FET) 114 for respectively controlling the adsorption electrodes 2a and 2b may be formed on the substrate 1 of the present optical switch.

As described above, each of the adsorption electrode control circuits 114 includes the source diffusion layer 21a or 21b, the source electrode 23a or 23b, the gate electrode wire 24a or 24b, the drain diffusion layer 20a or 20b, and the drain electrode 22a or 22b.

In this arrangement, when an operating current is applied the gate electrode wire 24a while a voltage for generating electrostatic force is applied to the drain electrode 22a, the adsorption electrode control circuit 114 turns ON. Then, the voltage applied to the drain electrode 22a is applied to the adsorption electrode 2a of the present optical switch through the source electrode 23a. As a result, electrostatic force is generated between the rocking plate 5 and the adsorption electrode 2a, and the rocking plate 5 tilts toward the adsorption electrode 2a.

By thus integrating the present optical switch with the adsorption electrode control circuits 114, these circuits can be mounted on a single chip. Therefore, only small area is required in order to mount these circuits on a printed circuit. As a result, it is possible to attain miniaturization and cost reduction of a device including the present optical switch.

The same effects (miniaturization and cost reduction) can be attained by using other semiconductor elements as the circuits 114, instead of using the FET. Examples of other semiconductor elements include a C-MOS transistor, a bipolar transistor (HBT or the like), and a diode.

In the arrangement of FIG. 25, the modules 223a and 223b are provided on the optical system substrate 222. However, the module substrates 223a, 223b, and the optical system substrate 222 may be integrated.

In the arrangement of FIG. 23, the supporting columns 3 are respectively provided on the supporting-column-use electrodes 211. However, instead of the supporting-column-use electrodes 211, the diffusion layers 6 and the drawing electrodes 106 shown in FIG. 1 may be used. The diffusion layers 6 and the drawing electrodes 106 have the same function as the supporting-column-use electrodes 211, although structures are different.

Depending on the material of the supporting columns 3, there are cases where mechanical strength of the supporting columns 3 can be enhanced by respectively providing the supporting columns 3 on the diffusion layers 6. For example, the supporting columns 3 become stronger if the diffusion layers 6 are formed on the substrate 1, which is a semiconductor made of silicon, and polycrystalline silicon is provided thereon and shaped into the supporting columns 3. This is because crystalline bond is caused between the silicon substrate 1 and the polycrystalline silicon supporting column 3.

Likewise, the strength of the supporting columns 3 can be enhanced if the supporting columns 3 are made of metal and formed on metal wires. If the supporting columns 3 are made of polycrystalline silicon and formed on metal wires, the mechanical strength becomes weaker, because the bond strength becomes weaker.

In manufacturing the present optical switch (or the present switch), it is preferable to form the metal film 18, which is to be the rocking plate 5, under a stress-free condition. Therefore, if the metal film 18 is to be made of tungsten nitride, it is preferable to form the metal film 18 by spattering in an atmosphere of nitrogen using a tungsten target. In this case, the stress applied against the metal film 18 can be reduced by increasing the film-formation pressure.

Usually, tungsten is turned into a state of columnar crystal when shaped into a film by spattering, and is therefore subjected to high tensile stress. On the other hand, tungsten nitride, which has a high level of nitrogen content, is turned into a state of granular crystal when shaped into a film by spattering, and is therefore subjected to high compression stress.

Therefore, in performing spattering, it is preferable to set the condition (pressure) of the atmosphere of nitrogen so as to minimize the stress applied against the tungsten nitride shaped into a film. If the pressure of the atmosphere of nitrogen is set too low, the nitrogen content in the tungsten nitride becomes small, and the tensile stress becomes high. If the pressure of the atmosphere of nitrogen is set too high, the nitrogen content in the tungsten nitride becomes high, and the compression stress becomes high.

It is explained above that the present system can be used as a transponder for optical communication. However, the present system is applicable to any control device provided to any machine, as long as the control device requires switching operation.

The contact electrodes 10a and 10b (see FIG. 1), which electrically interact with (electrically attract and attracted by) the adsorption electrodes 2a and 2b, may be provided also on the rocking plate 5 of the present optical switch.

As described above, an electrostatic actuator of the present invention (hereinafter "the present actuator") is an electrostatic actuator in which a rocking plate is electrostatically attracted by an adsorption electrode provided on a substrate, the electrostatic actuator including: a plurality of supporting columns, which are fixed on the substrate and arranged in a line, for pivotally supporting the rocking plate.

The present actuator is an electrostatic actuator (electrostatic microactuator), which is a MEMS technology. The electrostatic actuator is a structure that moves a movable section (the rocking plate) by means of electrostatic force.

Thus, the present actuator has the rocking plate provided above the substrate, and has the adsorption electrodes provided on a surface of the substrate so as to generate electrostatic force. The adsorption electrodes attract (tilt) the rocking plate to the substrate by means of the electrostatic force (attracting force) thereof. In this way, a switching function or the like function is attained.

In particular, the present actuator has the plurality of supporting columns arranged in a line on the substrate, and the rocking plate is provided on the plurality of supporting columns. In other words, the present actuator is designed so that the rocking plate is pivoted by (pivotally mounted on) the plurality of supporting columns. Therefore, the rocking plate is designed to tilt toward both sides of the line of supporting columns.

Thus, the present actuator is arranged so that the rocking plate is pivoted by the supporting columns. Therefore, if the present actuator is applied to a microswitch or a micro optical switch, it is not necessary to provide a narrow beam for the rocking plate. As a result, it is possible to prolong the life of the switch.

In the present actuator, the number of the supporting columns may be only two. With this arrangement, it is easy to arrange the supporting columns in a line (any arrangement makes a line).

In the present actuator, each of the supporting columns may have a leg portion and a column capital portion, the leg portion being a portion fixed on the substrate and the column capital portion being a portion provided on the leg portion. In this case, it is preferable that the column capital portion is thicker than the leg portion.

Moreover, in this case, it is preferable that the rocking plate has hollow domed portions, and that the column capital portion of each of the supporting columns is engaged with a corresponding domed portion.

In this arrangement, it is preferable that each of the dome portions is (pivotally) engaged with the column capital portion of a corresponding supporting column in such a manner as to surround (cover) the column capital portion.

In this case, the column capital portion of the supporting column contacts an inner wall of the dome portion, and pivotally support the rocking plate 5 at a contact portion. When the rocking plate 5 tilts, the inner wall of the dome potion slides on the column capital portion.

With this arrangement, it is easy to tilt the rocking plate by using the supporting columns as a fulcrum, and it is possible to prevent the rocking plate from being separated (detached) from the supporting columns.

If each of the supporting columns has the leg portion and the column capital portion as described above, it is preferable to integrate these portions.

If the rocking plate has the dome portions, it is preferable that each of the domed portions has an inner wall having a spherical surface shape, and the column capital portion of each of the supporting columns has a spherical surface shape at a portion that contacts the corresponding domed portion.

The spherical shape is a shape that is a portion of a spherical surface. With this arrangement, the domed portion can easily slide on the column capital portion.

The present actuator can be manufactured by performing semiconductor processing on the single substrate. On the substrate of the present actuator, an adsorption electrode controlling circuit, which is a semiconductor element for controlling (driving) the adsorption electrode of the present actuator, may be integrated.

With this arrangement, the present actuator and the control circuit can be mounted on a single chip. Therefore, packaging area of the present actuator and the control circuit on a printed substrate can be reduced. As a result, an electronic device including the present actuator can be miniaturized, and manufactured at a lower cost.

In the present actuator, it is preferable to connect the supporting columns to electrodes for fixing potentials of the supporting columns. For example, the supporting columns may be respectively formed on such electrodes.

A microswitch of the present invention (present switch) includes the present actuator and a pair of signal line electrodes, which are provided on the substrate of the present actuator, for being electrically connected to each other through the rocking plate when the rocking plate is attracted (tilted) toward the substrate. By including the present actuator, the present switch is a highly reliable, practical microswitch that can endure many times of switching operation (has a long operation life).

If the present switch is used in an electronic device (e.g. a communication device), circuits can be switched with low loss. Therefore, it is possible to realize a small and low-cost electronic device.

The pair of signal line electrodes of the present switch is provided to at least one side of the supporting columns arranged in a line on the substrate. The present switch may be arranged so that the rocking plate (which is conductive) contacts and short-circuits the pair of signal line electrodes, and thereby electrically connects the pair of signal line electrodes. On the rocking plate, a contact electrode for electrically connecting the signal line electrodes may be provided at a portion that contacts the signal line electrodes.

If a radio frequency signal is transmitted between the signal line electrodes, it is not necessary that the rocking plate (or the contact electrode) directly contacts the signal line electrodes.

In this case, a dielectric material may be provided at least at (i) a portion of the signal line electrodes that contacts the rocking plate or (ii) a portion of the rocking plate that contacts the signal line electrodes.

Even if the dielectric material is not provided, signal transmission can be performed if the gap between the rocking plate and the signal line electrodes is very narrow. In this case, a stopper for limiting a driven range (degree of tilt) of the rocking plate so as to create a gap between the rocking plate and the signal line electrodes when the rocking plate is attracted toward the substrate (a stopper for preventing direct contact between the rocking plate and the signal line electrodes) may be provided on the substrate.

With the foregoing arrangements, since the rocking plate does not directly contact the signal line electrodes, it is possible to attain low loss and high isolation.

The accuracy of the thickness of the dielectric material provided between the rocking plate and the signal line electrodes is important, because it determines the capacitance value. If is preferable that the capacitance value is set to a value suitable for the switching characteristic at the frequency of the signal transmitted. The preferable value varies according to the frequency of the signal transmitted.

As described above, the present actuator is arranged so that the rocking plate is electrostatically attracted by the adsorption electrode. The present actuator may be arranged so that the rocking plate is tilted in one direction by one adsorption electrode.

Alternatively, the present actuator may be driven so that the rocking plate is tilted simultaneously by a plurality of adsorption electrodes. In this case, a portion of the rocking plate may be deformed elastically. If the present actuator is applied to a switch, more than one contact points (a pair of signal line electrodes) can be (electrically) connected.

If a light-reflecting film is provided on the surface of the rocking plate, it is possible to form a micro optical switch (present optical switch) by using the present actuator. The present optical switch changes optical paths of a laser beam or the like by using the present actuator.

The present optical switch may be used to form a micro optical switch system (micro optical switch device). The system (the present system) can be consisted of the present optical switch, a light source for emitting light onto the light-reflecting film of the present optical switch, and a light receiver for receiving reflected light from the light-reflecting film.

By including the present actuator, the present system is a highly reliable, practical micro optical switch system that can endure many times of switching operation (has a long operation life). If the present system is used in an electronic device (e.g. an optical communication device), circuits can be switched with low loss. Therefore, it is possible to realize a small and low-cost electronic device.

The light source of the present system may be an input-use optical waveguide (an optical fiber or the like) for outputting an optical signal received from outside toward the light-reflecting film. Likewise, the light receiver may be an output-use optical waveguide for receiving an optical signal reflected on the light-reflecting film and outputting the optical signal toward outside. With this arrangement, the present system can be used as a relay point for optical communication (information communication through optical signals).

The light source of the present system may be a light-emitting element (laser diode) for emitting light in accordance with an electric signal (voltage signal or the like) received from outside onto the light-reflecting film. The light receiver may be a light-receiving element (photoelectric conversion element; photodiode or the like) for receiving the light reflected on the light reflecting film, converting the light into an electric signal, and outputting the electric signal.

On the surface of the light source (the portion that outputs light onto the light-reflecting film), a lens having a function of condensing light (light-condensing lens) may be provided. With this arrangement, the optical path of the emitted light can be narrowed. Therefore, light can be emitted onto the light-reflecting layer certainly (efficiently).

The lens may be provided also on the surface of the light receiver (the portion that receives the reflected light from the light-reflecting film). With this arrangement, the reflected light from the light-reflecting film can be condensed onto the light receiver efficiently.

The present actuator can be manufactured by the following first to fifth steps. First, supporting columns and an adsorption electrode are formed on a substrate (first step). Next, on the entire surface of the substrate (including the supporting columns), a sacrificial film (sacrificial layer), such as an insulating film, is formed (second step).

After that, on the sacrificial film, a conductive film made of tungsten nitride or the like is formed (third step). The conductive film, which is on the sacrificial film, may be other high-melting-point metal (e.g. titanium, nickel, aluminum, platinum, gold, or the like).

The conductive film is patterned so as to form a rocking plate (fourth step). Then, the sacrificial film, which is under the rocking plate, is removed (fifth step).

With the foregoing steps, the present actuator can be manufactured easily by performing semiconductor processing on the single substrate 1. Therefore, manufacturing steps can be simplified, and the present switch can be miniaturized easily.

In the fourth step, a through hole may be provided in the rocking plate. The sacrificial film is removed after the fourth step usually by etching. At this time, if a through hole is provided in the rocking plate, etchant can be injected through the through hole. Therefore, the sacrificial film can be removed efficiently. In this case, the through hole is provided in the rocking plate of the present actuator manufactured.

Thus, the present invention is applicable to a switch using an electrostatic actuator (electrostatic micro actuator), and an electronic device including the switch, such as an electronic device (communication device) such as a portable phone (wireless communication device).

The present switch can also be described as follows. In the present switch, two supporting columns 3 are provided on a substrate 1, and a rocking plate 5 is provided on the supporting columns 3. The rocking plate 5 is pivoted by (pivotally mounted on) the two supporting columns 3. At end portions of the rocking plate 5, a plurality of beams are provided, and the beams are subjected to electrostatic force of adsorption electrodes 2a and 2b.

The circuit of FIG. 22 can also be described as an example of application of the present switch to a switch for switching a transmission circuit and a receiving circuit of a wireless communication circuit. Switches 146 and 147 connected to an antenna 141 switch a receiving signal line electrode 144 and a transmission signal line electrode 145. Operation states are as follows. In performing transmission, the transmission signal line electrode 145 of the wireless communication circuit is connected to the antenna 141 by turning ON the switch 147, which is connected to a filter 143, and a signal is transmitted from the antenna 141. In performing receiving, the switch 146, which is connected to the antenna 141, is turned ON, and a signal is received by the antenna 141 and, through the switch 146, a filter 142, and the receiving signal line electrode 144, introduced into the receiving circuit of the wireless communication circuit. In this example, the present switch is used to switch between transmission and receiving of the antenna 141. However, the present switch may be mixed with, for example, the above-described circuit for changing the capacitance of a capacitor, so as to switch transmission and receiving while adjusting the circuit. A radio frequency power amplifier is used both for transmission and receiving. Through the switch, different circuits are connected to the amplifier at the time of transmission and at the time of receiving. The switch is usually made of semiconductor. By using the present switch, high-isolation low-loss switching can be performed. As a result, low power consumption can be attained.

The present switch can also be described as follows. The present switch may be arranged so that the supporting columns are made of metal and respectively formed on metal wires formed on the surface of the substrate. The beams may be made of metal, such as metal obtained by nitriding high-melting-point metal such as tungsten. In particular, if the substrate is a semiconductor substrate, a semiconductor element is formed on the substrate, and the present switch is formed to form a lamination, it is necessary to form the present switch in a temperature range that does not change characteristics of the semiconductor element. Therefore, manufacturing steps should be performed at about 300° C. or lower. Therefore, by using metal as a material of the supporting columns and the beams, and forming the supporting columns and the beams by spattering or the like method, the present switch can be integrated or laminated with the semiconductor element. Although the diffusion layers 6 are provided on the substrate 1 so as to obtain potentials at the supporting columns 3, the same effect can be attained by using low-resistance metal wires.

It can also be said that an object of the present invention is to provide an electrostatic actuator that can be used to form a highly reliable low-voltage microswitch. To attain this object, in the present switch, two supporting columns 3 are provided on a substrate 1, and a rocking plate 5 are provided on the supporting columns 3. The rocking plate 5 is pivoted by the two supporting columns 3. Between the rocking plate 5 and the adsorption electrodes 2a and 2b provided on the substrate 1, electrostatic force is generated. In the present witch, the rocking plate is in a half-fixed state by being engaged with the supporting columns. With this arrangement, it is possible to tilt (drive) the rocking plate at low voltage and thereby prolong the life of the present switch.

It can also be said that the supporting-column-use electrodes 211 of FIG. 23 are electrode wires for fixing the potentials of 1L the supporting columns, and that the supporting columns are respectively provided on the electrodes and wires drawn from the electrodes are provided on the substrate.

It is preferable to form the tungsten nitride film, which is to be the rocking plate 5, under a stress-free condition. This can be attained by a spattering method performed by using a tungsten target in an atmosphere of nitrogen. This is made possible by increasing film-formation pressure and thereby reducing the stress. Usually, tungsten is turned into a state of columnar crystal when shaped into a film by spattering, and is therefore subjected to high tensile stress. By forming the film in an atmosphere of nitrogen, tungsten is turned into a state of granular crystal, so as to increase compression stress. It is preferable to set a condition on the nitrogen content that minimizes the stress. If the pressure is low, the nitrogen content is small, and the tensile stress is high. If the pressure is low, the compression stress is high.

If the inner wall of the case 220 shown in FIGS. 27(a) and 27(b) is painted black or coated with resin or the like so as to prevent or absorb light reflection, or if the case 220 is made of antireflection material, it is possible to absorb light reflected on the rocking plate and thereby prevent incidence of the light into the light-receiving element from being caused by diffuse reflection. As a result, malfunctions can be reduced.

The circuit of FIG. 30 can be connected to a transponder for optical communication. Although only one optical micro switch and two pairs of input and output optical fibers are shown in FIG. 30, a plurality of optical signals can be switched if a plurality of optical micro switches and plural pairs of input and output optical fibers are provided. By using these at a transponder for optical communication, a high-accuracy optical communication network can be established.

The present invention can also be described as the following first to fourth electrostatic actuators, first to third microswitches, and first and second manufacturing methods. The first electrostatic actuator is an electrostatic actuator, in which a rocking plate is electrostatically attracted by an adsorption electrode provided on a substrate, the electrostatic actuator including: two supporting columns, which are fixed on the substrate, for pivotally supporting the rocking plate; a signal line provided on the substrate; and a contact electrode provided on a bottom surface of the rocking plate. In the actuator, the two supporting columns are provided on the substrate, and the rocking plate is provided on the supporting columns. The rocking plate is pivoted by (pivotally mounted on) the supporting columns. At end portions of the rocking plate, beams (stick-shaped members) are provided, and the beams are subjected to electrostatic force of the adsorption electrode. In this actuator, since the rocking plate is pivoted by the supporting columns, the directions of tilt of the rocking plate (or the beams) (rocking directions; the directions in which the rocking plate is attracted by the adsorption electrode) can be changed freely if the adsorption electrode is provided with respect to each beam. Therefore, by using the actuator in a microswitch, it is possible to provide a long-life micro switch, because it is not necessary to provide a narrow beam to the rocking plate.

The second electrostatic actuator is the first electrostatic actuator, wherein: each of the supporting columns has a leg portion and a column capital portion, the leg portion being a portion fixed on the substrate and the column capital portion being a portion provided on the leg portion and thicker than the leg portion; each beam has a hollow domed portion; and the column capital portion of each of the supporting columns is engaged with the domed portion. The third electrostatic actuator is the second electrostatic actuator, wherein: the domed portion has an inner wall having a spherical surface shape, and the column capital portion of each of the supporting columns has a spherical surface shape at a portion that contacts the domed portion. The fourth electrostatic actuator is the first electrostatic actuator, further including: an adsorption electrode control circuit, which is provided on the substrate, for controlling the adsorption electrode.

The first microswitch includes the first electrostatic actuator, and a pair of signal line electrodes, which are provided on the substrate, for being electrically connected to each other through the rocking plate when the rocking plate is attracted toward the substrate. The second microswitch is the first microswitch, further including: a dielectric material provided on at least one of (i) the pair of signal line electrodes at such a portion as to contact the rocking plate and (ii) the rocking plate at such a portion as to contact the pair of signal line electrodes. The third microswitch includes a stopper, which is provided on the substrate, for limiting a driven range of the beam, so as to create a gap between the rocking plate and the pair of signal line electrodes when the beam is attracted toward the substrate. The first communication device includes a circuit using one of the first to third microswitches.

The first manufacturing method is a method of manufacturing the first electrostatic actuator, including: a first step, in which the supporting columns and the adsorption electrode are formed on the substrate; a second step, in which a sacrificial film is formed on an entire surface of the substrate, including the supporting columns; a third step, in which a conductive film is formed on the sacrificial film; a fourth step, in which the rocking plate is formed by patterning the conductive film; and a fifth step, in which the sacrificial film, which is under the rocking plate, is removed. The second manufacturing method is the first manufacturing method, wherein: in the fourth step, a through hole is formed in the rocking plate.

The present invention can also be described as the following first to ninth optical switching devices and first optical communication device. The first optical switching device is a micro optical switching device, including: an electrostatic actuator in which a rocking plate is electrostatically attracted by an adsorption electrode provided on a substrate, the electrostatic actuator including a plurality of supporting columns, which are fixed on the substrate and arranged in a line, for pivotally supporting the rocking plate; and a light reflector provided on a surface of the rocking plate.

The second optical switching device is the first optical switching device, wherein: the number of the supporting columns is two. The third optical switching device is the first or second optical switching device, further including: a light-emitting element and a light-receiving element provided on a surface that faces the light reflector. The fourth optical switching device is the first or second optical switching device, wherein: each of the supporting columns has a leg portion and a column capital portion, the leg portion being a portion fixed on the substrate and the column capital portion being a portion provided on the leg portion and thicker than the leg portion; the rocking plate has hollow domed portions at end portions thereof; and the column capital portion of each of the supporting columns is engaged with a corresponding domed portion.

The fifth optical switching device is the first or second optical switching device, wherein: the supporting columns are provided on electrodes, which are provided on the substrate, for fixing potentials. The sixth optical switching device is the first or second optical switching device, further including: an optical waveguide provided on a surface corresponding to the light reflector. The seventh optical switching device is the third optical switching device, wherein: the light-emitting element is a laser diode, and the light-receiving element is a photodiode. The eighth optical switching device is the third optical switching device, wherein: a lens is provided on a surface of the light-emitting element and/or the light-receiving element. The ninth optical switching device is the third optical switching device, wherein: the substrate is a semiconductor substrate, and an operation circuit of the optical switch is provided on the substrate. The first optical communication device includes one of the first to ninth optical switching devices.

In the first to ninth optical switching devices, the rocking plate is in a half-fixed state. Since spring force of the rocking plate is not utilized, it is not necessary to apply electrostatic force sufficient for bending a spring. Therefore, the angle of the rocking plate can be changed even if the applied voltage is low. Moreover, since the rocking plate is in a half-fixed state, the angle of the rocking plate can be changed quickly. Therefore, the reflection angle of light can be changed quickly. Therefore, quick switching operation can be performed. Furthermore, since no spring is used, the life of the switch can be prolonged.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An electrostatic actuator in which a rocking plate is electrostatically attracted by an adsorption electrode provided on a substrate, the electrostatic actuator comprising:
   a plurality of supporting columns, which are fixed on the substrate and arranged in a line, for pivotally supporting the rocking plate, wherein:
   each of the supporting columns has a leg portion and a column capital portion, the leg portion being a portion fixed on the substrate and the column capital portion being a portion provided on the leg portion;
   the rocking plate has hollow domed portions;
   the column capital portion of each of the supporting columns is engaged with a corresponding domed portion;
   each of the domed portions has an inner wall having a spherical surface shape, and the column capital portion has a spherical surface shape at a portion that contacts the corresponding domed portion; and
   the corresponding domed portion surrounds the column capital portion so as not to be separated from the column capital portion.

2. The electrostatic actuator as set forth in claim 1, wherein: the number of the supporting columns is two.

3. The electrostatic actuator as set forth in claim 1, further comprising:
   an adsorption electrode control circuit, which is provided on the substrate, for controlling the adsorption electrode.

4. The electrostatic actuator as set forth in claim 1, wherein: the supporting columns are connected to electrodes for fixing potentials of the supporting columns.

5. The electrostatic actuator as set forth in claim 1, wherein: the substrate is an anti-insulating substrate, a ceramic substrate, an InP substrate, a GaN substrate, or an SiC substrate.

6. The electrostatic actuator as set forth in claim 1, wherein: the rocking plate is supported so as to pivot about an axis parallel to the line in which the plurality of supporting columns are fixed.

7. The electrostatic actuator as set forth in claim 1, wherein: the rocking plate is slidable relative to the supporting columns.

8. An electrostatic actuator in which a rocking plate is electrostatically attracted by an adsorption electrode provided on a substrate, the electrostatic actuator comprising:
   a plurality of supporting columns, which are fixed on the substrate and arranged in a line, for pivotally supporting the rocking plate, wherein:
   each of the supporting columns has a leg portion and a column capital portion, the leg portion being a portion fixed on the substrate and the column capital portion being a portion provided on the leg portion and thicker than the leg portion;
   the rocking plate has hollow domed portions; and
   the column capital portion of each of the supporting columns is engaged with a corresponding domed portion.

9. The electrostatic actuator as set forth in claim 8, wherein:
each of the domed portions has an inner wall having a spherical surface shape, and the column capital portion of each of the supporting columns has a spherical surface shape at a portion that contacts the corresponding domed portion.

10. The electrostatic actuator as set forth in claim 8, wherein:
each of the domed portions has an inner wall having a triangular pyramid shape, and the column capital portion of each of the supporting columns has a triangular pyramid shape at a portion that contacts the corresponding domed portion.

11. The electrostatic actuator as set forth in claim 8, wherein:
the column capital portion and the leg portion of each of the supporting columns are made of polycrystalline silicon.

12. A microswitch, comprising:
an electrostatic actuator in which a rocking plate is electrostatically attracted by an adsorption electrode provided on a substrate, the electrostatic actuator including a plurality of supporting columns, which are fixed on the substrate and arranged in a line, for pivotally supporting the rocking plate, wherein:
each of the supporting columns has a leg portion and a column capital portion, the leg portion being a portion fixed on the substrate and the column capital portion being a portion provided on the leg portion and thicker than the leg portion;
the rocking plate has hollow domed portions; and
the column capital portion of each of the supporting columns is engaged with a corresponding domed portion; and
a pair of signal line electrodes, which are provided on the substrate, for being electrically connected to each other through the rocking plate when the rocking plate is attracted toward the substrate.

13. The microswitch as set forth in claim 12, further comprising:
a contact electrode, which is provided on the rocking plate at such a portion as to contact the pair of signal line electrodes, for electrically connecting the pair of signal line electrodes.

14. The microswitch as set forth in claim 12, further comprising:
a dielectric material provided on at least one of (i) the pair of signal line electrodes at such a portion as to contact the rocking plate and (ii) the rocking plate at such a portion as to contact the pair of signal line electrodes.

15. The microswitch as set forth in claim 12, further comprising:
a stopper, which is provided on the substrate, for limiting a driven range of the rocking plate, so as to create a gap between the rocking plate and the pair of signal line electrodes when the rocking plate is attracted toward the substrate.

16. The microswitch as set forth in claim 15, wherein:
the gap is several tens of nanometers.

17. The microswitch as set forth in claim 12, further comprising:
a signal circuit provided on the substrate and connected to the pair of signal line electrodes.

18. A communication device, comprising:
a microswitch including
an electrostatic actuator in which a rocking plate is electrostatically attracted by an adsorption electrode provided on a substrate, the electrostatic actuator including a plurality of supporting columns, which are fixed on the substrate and arranged in a line, for pivotally supporting the rocking plate, wherein:
each of the supporting columns has a leg portion and a column capital portion, the leg portion being a portion fixed on the substrate and the column capital portion being a portion provided on the leg portion and thicker than the leg portion;
the rocking plate has hollow domed portions; and
the column capital portion of each of the supporting columns is engaged with a corresponding domed portion; and
a pair of signal line electrodes, which are provided on the substrate, for being electrically connected to each other through the rocking plate when the rocking plate is attracted toward the substrate.

* * * * *